(12) United States Patent
Koebler

(10) Patent No.: US 9,954,207 B2
(45) Date of Patent: *Apr. 24, 2018

(54) LITHIUM BATTERY WITH SOLID STATE SWITCH

(71) Applicant: Martin Koebler, Davidson, NC (US)

(72) Inventor: Martin Koebler, Davidson, NC (US)

( * ) Notice: Subject to any disclaimer, the term of this patent is extended or adjusted under 35 U.S.C. 154(b) by 145 days.

This patent is subject to a terminal disclaimer.

(21) Appl. No.: 14/657,101

(22) Filed: Mar. 13, 2015

(65) Prior Publication Data

US 2016/0268645 A1 Sep. 15, 2016

Related U.S. Application Data

(63) Continuation-in-part of application No. 13/989,273, filed as application No. PCT/US2011/001937 on Nov. 28, 2011, now Pat. No. 9,412,994.

(60) Provisional application No. 61/458,657, filed on Nov. 29, 2010, provisional application No. 61/463,736, filed on Feb. 22, 2011.

(51) Int. Cl.
*H01M 2/10* (2006.01)
*H01M 2/34* (2006.01)
*H01M 10/42* (2006.01)
*H01M 10/52* (2006.01)

(52) U.S. Cl.
CPC ........... *H01M 2/1077* (2013.01); *H01M 2/34* (2013.01); *H01M 10/425* (2013.01); *H01M 10/52* (2013.01); *H01M 2010/4271* (2013.01); *H01M 2200/00* (2013.01); *H01M 2220/20* (2013.01)

(58) Field of Classification Search
CPC ...... H01M 2/1077; H01M 2/34; H01M 2/425; H01M 10/425
See application file for complete search history.

(56) References Cited

U.S. PATENT DOCUMENTS

| 4,166,241 A * | 8/1979 | Grant | H02J 7/0034 320/105 |
|---|---|---|---|
| 5,552,642 A * | 9/1996 | Dougherty | B60R 25/04 180/287 |
| 2005/0110467 A1* | 5/2005 | Thomason | H02J 7/0031 320/165 |
| 2006/0087280 A1* | 4/2006 | Miyashita | H01M 2/1072 320/104 |
| 2008/0084182 A1* | 4/2008 | Oberlin | H01M 10/052 320/116 |
| 2009/0020094 A1* | 1/2009 | Ono | F02N 11/0866 123/179.28 |
| 2010/0136390 A1* | 6/2010 | Ueda | H01M 10/482 429/61 |
| 2013/0241498 A1* | 9/2013 | Koebler | H02H 7/18 320/135 |
| 2015/0318582 A1* | 11/2015 | Brockman | G01R 31/3606 320/137 |

* cited by examiner

*Primary Examiner* — Jonathan G Jelsma
(74) *Attorney, Agent, or Firm* — Ralph Dougherty

(57) ABSTRACT

Apparatus for increasing the efficiency of a starter battery for a starter motor of an internal combustion engine in a battery pack arrangement with one or more lithium based cells. The invention includes a solid state switching configuration for high powered battery systems for protecting against overcharging, over-discharging and short circuiting of batteries, especially starter batteries for internal combustion engines. The invention is also useful as a Deep Cycle battery.

21 Claims, 22 Drawing Sheets

*Fig. 5*
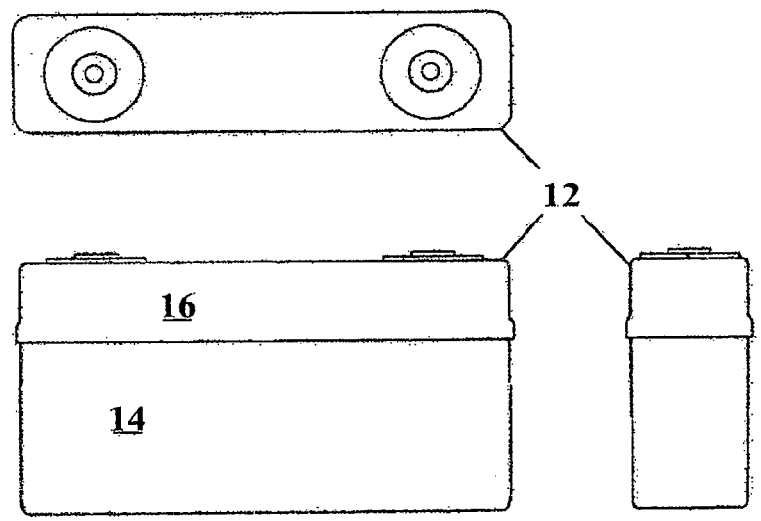
*Fig. 4*         *Fig. 6*
*Fig. 7*         *Fig. 8*
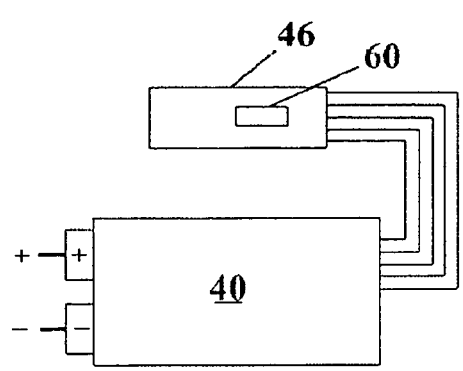 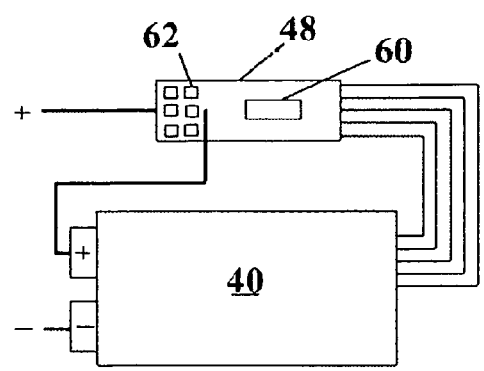

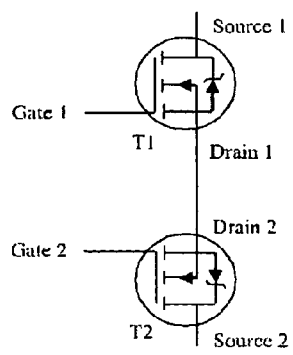
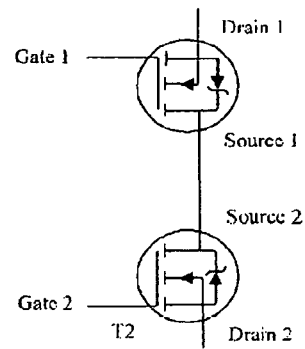
Fig. 14  Fig. 15
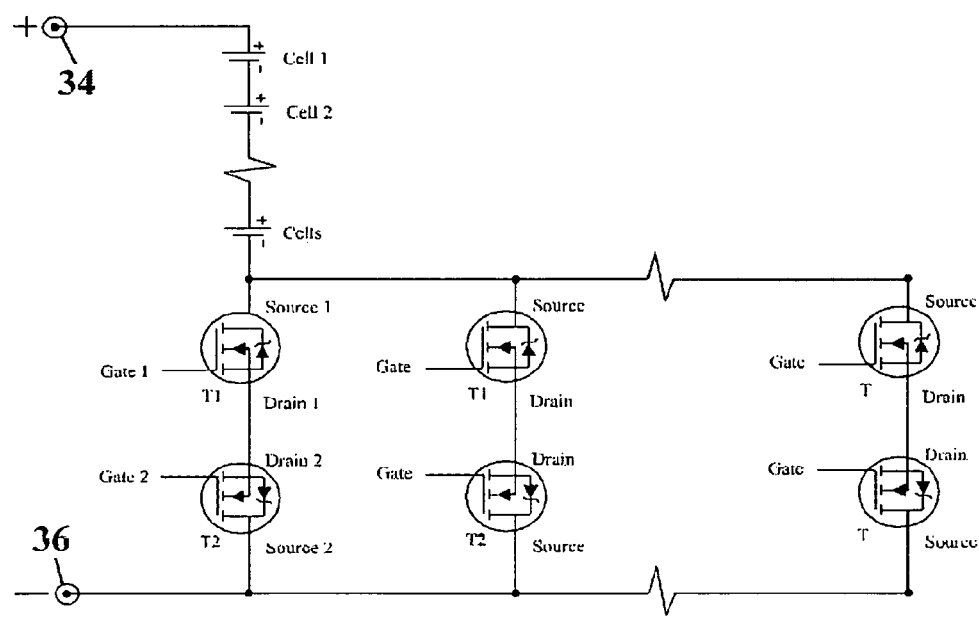
Fig. 16

LITHIUM BATTERY WITH SOLID STATE SWITCH

CROSS REFERENCE TO RELATED APPLICATIONS

This application is a Continuation-in-part of U.S. patent application Ser. No. 13/989,273, filed May 23, 2013, and also claims the benefit of priority of the following applications: PCT Application No. PCT/US2011/001937, filed 28 Nov. 2011; U.S. Provisional Patent Application Ser. No. 61/458,657, filed 29 Nov. 2010; and U.S. Provisional Patent Application Ser. No. 61/463,736, filed 22 Feb. 2011.

FIELD OF THE INVENTION

The present invention relates to an apparatus for starting an internal combustion (IC) engine. More particularly, the invention is a lithium-based cell for starting such engines. The invention includes a solid state switching configuration for high powered battery systems for protecting against over-charging, over-discharging and short circuiting of batteries, especially starter batteries for internal combustion engines (ICE). In addition, the invention is useful for powering an electric motor for starting an internal combustion engine, and as a dep cycle battery.

BACKGROUND OF THE INVENTION

Presently, internal combustion engines use a starter battery comprised of lead-acid to turn over an electric motor to start an IC engine. Lead-acid batteries are heavy, bulky, and have short cycle life, short calendar life, and low turn around efficiency. Lead-acid batteries also have a high internal impedance (resistance) that is greater in cold weather making it more difficult to start an IC engine in cold weather with less current available. To overcome these variables, lead-acid starter batteries are provided with oversized battery capacity in order to produce the necessary current needed for an electric starter to start an IC engine. The oversized lead-acid battery increases the weight, space requirement, and cost needed to start an IC engine.

In order to turn off power terminals in presently known starter batteries, expensive electronic/electrical components are required to handle the high current loads that a starter motor needs to turn over an IC engine. These embody electronic protection circuitry for upper voltage cut-off (overcharging), lower level voltage cut-off (over discharging) and temperature measurements. These circuits also induce heat losses and electrical losses that can be large, as well as taking up additional space. (Noise) spikes can trigger false voltage, temperature or current readings that can terminate the battery system's operation, when in fact all the cells are working within safe specifications. Some of these protection circuits are temperamental and difficult to reactivate once they have been triggered. For example, if an under-voltage condition happens and the cells are still in under-voltage condition with a relay approach, current can not be provided to the cells since a path has been broken thus another button needs to be pressed to activate the system for a short duration in order to allow the cells to charge. Also, in some cases such as a military application or racing application, every last bit of energy needs to be extracted, even if it damages the battery.

With any type of rechargeable (secondary) battery used, the battery does not operate well in a low state of charge (SOC), which in most cases is a low battery voltage. Whenever a battery is at a low voltage level, the battery can suffer internal damage permanently or the battery life can be drastically reduced. With battery chemistries such as lithium, over-charging a battery can be even more dangerous, potentially leading to an exothermal runaway reaction, which can create a fire. With a solid state switch placed in-line with the battery output power terminals, the solid state switch can be electronically controlled to open or close the current pathway leaving or entering the battery. This can prevent battery damage from happening if the battery voltage is brought too low or too high. This can be applied to any type of battery chemistry at any voltage. An example is to apply the solid state switch to a 12V car battery that starts a vehicle. A vehicle might have a voltage drain source left on, in which case the solid state switch would automatically turn off the current flow from the battery before the battery is damaged.

A relay or contactor could be used as well, but has the following disadvantages:

1) A relay or contactor continuously needs current to keep the contactor open or closed. That requires energy to do so.

2) A relay or contactor having a closed pathway allows current to flow in both directions and can not be controlled for a single direction.

3) A relay or contactor can only be ON or OFF. During a switching process for large currents large arcing can occur inside the relay or contactor, and that can cause the relay or contactor to "weld" shut. Once a relay or contactor is welded shut, no switching can occur at that point, which can be a safety issue, i.e., by not allowing switching to occur when needed.

4) Relays and contactors are large and bulky for larger current applications.

A better approach is to use a solid state switch either a FET, a MOSFET (metal-oxide-semiconductor field-effect transistor), or IGBT (insulated gate bipolar transistor) format, but not limited to these, in a unique configuration. The unique configuration involves connecting two solid state devices such as MOSFET or IGBT with the "Sources" or "Drains" tied together electrically. These solid state devices can be either N or P type. A doped semiconductor containing excess holes is called "p-type", and when it contains excess free electrons it is known as "n-type", where p (positive for holes) or n (negative for electrons) is the sign of the charge of the majority mobile charge carriers. This arrangement simplifies the control electronics needed and also allows current to flow in one direction but not the other with the internal diode. An FET (field-effect transistor) is a majority-charge-carrier device having an active channel through which majority charge carriers, electrons or holes, flow from the source to the drain. Source and drain terminal conductors are connected to semiconductor through ohmic contacts. The majority charge carriers enter the channel through the source and leave the channel through the drain. FIG. 15 shows the "Drain" of each terminal being connected, and FIG. 16 shows the "Source" of each terminal being connected.

The advantages of a solid state switch are:

1) A solid state switch needs very little energy to activate an allowed pathway to be open or close.

2) A solid state device can gradually increase current, controlling inrush current that might occur switching ON large power applications or providing instant short circuit protection if the current is too high.

3) A solid state switch can be very compact and light for higher power applications.

DESCRIPTION OF THE PRIOR ART

Applicant is aware of the following U.S. patent concerning battery packs for starting engines:

| U.S. Pat. No. | Issue Date | Inventor | Title |
| --- | --- | --- | --- |
| 7,525,287 | Apr. 28, 2009 | Miyashi | BATTERY PACK FOR DRIVING ELECTRIC MOTOR OF COMPACT ENGINE STARTING DEVICE, ENGINE STARTING DEVICE DRIVEN BY THE BATTERY PACK, AND MANUAL WORKING MACHINE HAVING THE ENGINE STARTING DEVICE |

SUMMARY OF THE INVENTION

The invention provides means for increasing the efficiency of a starter battery for a starter motor of an internal combustion engine. By replacing a lead-acid starter battery with a lithium base or lithium-iron-phosphate (LiFePO$_4$ or LiFePO) or LiFeMgPO$_4$ or LiFeYPO$_4$ cell, the needed capacity, weight and size is drastically reduced while increasing the cycle life, calendar life and turn around efficiency for a starter battery. The lithium iron phosphate (LiFePO$_4$) cell is a type of rechargeable cell, specifically a lithium ion cell, which uses LiFePO$_4$ as a cathode material. It may also include magnesium or yttrium in the lithium iron compound. Connecting four cylindrical cells in series, each of which has a standard industry cell format size of both 18650 (less than 3 Ah) or 26650 (less than 4 Ah), or prismatic flat or other type cells, enough current is available to penetrate to a starter motor rated for 12V system to start large IC engines that use 1, 2, 3, 4, 5, 6, 8, or 12 cylinders. Larger cells may be utilized in the invention, from 1 Ah to 5000 Ah, common sizes being 5 Ah, 10 Ah, 20 Ah, 50 Ah, 100 Ah, 400 Ah, and 500 Ah.

With a configuration of 4 cells in series, no protection circuit board is needed to protect the individual cells from over-voltage or undervoltage, unlike larger system using more cells which require a protection circuit board in them for safety protection. Individual cell balancing is also not needed for such a small starter battery but may be included to increase the product life. A smaller and lighter starter battery increases the performance of mobile systems that use starter batteries. The resulting increase of cycle life and calendar life reduces user costs.

No separate nor special charging system is needed with the invented system

The invention also comprises a housing for the lithium-based cells, with upper and lower mating casings, a contoured pad within the lower casing for receiving at least one lithium-based cell, and electrical connections from the at least one lithium-based batter to the exterior of the housing. Optionally, an upper battery pad may be placed in the upper casing, and, if desired, a protection circuit board, such as a balancing board or a cut-off circuit, may be placed within the upper casing for safety protection.

The invented solid state switch apparatus allows current to flow in one direction and not the other. A minimum of two solid state switches are arranged in a unique configuration, which allows current to flow in a controlled manner bidirectionally when needed. This is particularly useful for preventing overcharging or over-discharging an entire battery pack. A separate cell balancing circuit is used to balance out the individual cells. The solid state switch can be used on each individual cell, if desired, to prevent overcharging or over-discharging of the individual cell. It can be used with any battery application in which charging and discharging is required, and is particularly useful with lithium-based batteries. It can also be used with lead-acid batteries, nickel-cadmium (NiCd) batteries, and low self-discharge nickel metal hydride (NiMH) batteries. More sophisticated items of equipment to which a battery may be attached have programmable shut-off settings, but less sophisticated equipment does not have shut-off parameters in place. Using a battery in a starter applications (for instance, to start an IC engine) will prevent the battery from overcharging, as well as prevent the battery from being discharged to too low a level if a current drain (leakage) is present in the system, even though everything is turned off.

By connecting the "Sources" or the "Drains" together using a minimum of two solid state devices allows for automation and simplification to fully and partially switch the batteries power terminals ON and OFF. The two solid state devices can either be N or P type and connected either on the Positive or Negative side of the battery terminal and controlled by simple electronic circuit to control the drivers of the solid state devices.

This invented switch configuration also allows for short circuit protection across the battery power terminals, along with allowing the maximum current control when charging.

OBJECTS OF THE INVENTION

The principal object of the present invention is to provide means for increasing the performance of a starter battery for a starter motor of an internal combustion engine.

Another object of the invention is to provide a starter battery for an internal combustion engine that is lighter, more reliable, has less bulk, longer cycle life, longer calendar life, and higher turn around efficiency than lead-acid batteries.

A further object of this invention is to provide a starter battery system for an internal combustion engine that is easy to assemble, waterproof, and maintenance free.

Another object of the invention is to provide a starter battery for an internal combustion engine that can be used in existing vehicles.

Another object of the invention is to provide a starter battery for an internal combustion engine that has a wide operating temperature range with exceptional cold-weather cranking performance.

Another object of the invention is to provide an improved apparatus for protecting a single cell or battery from being overcharged or over-discharged.

Another object of the invention is to provide apparatus for charging a cell having a very low charge.

Another object of the invention is to provide apparatus for short circuit protection for one or more cells or batteries.

Another object of the invention is to provide apparatus for discharging a cell having too high a charge.

A further object of the invention is to provide an apparatus for short circuit protection in case a metal object causes a short circuit across the terminals.

Another object of the invention is to provide a jump starter for internal combustion engines of all sizes, including large engines such as those used in over the road tractors (18 wheelers), compressors, and generators.

Another object of the invention is to provide a deep cycle battery for use in wheel chairs, boats, hospital beds, campers and recreational vehicles, golf carts, and solar panels for remote areas.

BRIEF DESCRIPTION OF THE DRAWINGS

The foregoing and other objects will become more readily apparent by referring to the following detailed description and the appended drawings in which:

FIG. 4 is a front view of the assembled battery pack of FIG. 3, the rear view being identical.

FIG. 5 is a top view of the assembled battery pack of FIG. 3.

FIG. 6 is a right end view of the assembled battery pack of FIG. 3, the left end view being a mirror image thereof.

FIG. 7 is a schematic diagram of a block of 4 lithium prismatic cells in series connected to a balancing circuit board.

FIG. 8 is a schematic diagram of a block of 4 lithium prismatic cells in series connected to a balancing and cutoff circuit board

FIG. 14 is a schematic diagram of a Solid State Switch with "Drain" connection.

FIG. 15 is a schematic diagram of a Solid State Switch with "Source" connection.

FIG. 16 is a schematic diagram showing a preferred embodiment of the invention in which the "Drain" of each gate is connected together using N type MOSFET or IGBT with the cells being above the solid state switches.

DETAILED DESCRIPTION

Lithium containing LiFePO, LiFePO$_4$, LiFeMgPO$_4$, and LiFeYPO$_4$ cells have a low nominal cell voltage (3.2V-3.3V) that match directly with existing 12V lead-acid equivalent systems. Four LiFePO cells in series have a nominal voltage of 13.2V. Thus they can directly replace existing 12V lead-acid equivalent systems without requiring any electrical modification.

Other lithium chemistries have a higher nominal voltage, such as: lithium-cobalt (3.6V), lithium-manganese (3.7V-3.8V), lithium-nickel-cobalt-manganese (3.7V). Each of these thus have a higher system voltage when 4 cells are used in series. With the higher cell voltages, most existing 12V direct replacement systems will not be able to charge other lithium cell chemistries above 60% of their capacity. Other lithium-based cells that can be utilized in this invention are lithium-cobalt-oxide (LiCoO$_2$), lithium-manganese-oxide (LiMn$_2$O$_4$), lithium-nickel-cobalt-manganese-oxide (LiNiCoAlO$_2$), lithium-nickel-manganese-cobalt-oxide (LiNiMnCoO$_2$), and lithium-titanate (Li$_4$Ti$_5$O$_{12}$).

LiFePO, LiFePO$_4$, LiFeMgPO$_4$, and LiFeYPO$_4$ cells also have a higher thermal runaway condition than lead-acid cells. For a thermal runaway to occur, the cell temperature must be extremely hot (over 200° C.). When a cell reaches a certain temperature, mostly caused by overcharging, then the cell will start producing more heat by an internal reaction that fuels itself in most cases with a fire, which phenomenon is known as "thermal runaway". All other Lithium cell chemistries have a lower thermal runaway temperature making those cells more prone to catch on fire.

A thermal venting cap is usually placed inside each individual cylindrical cell casing to minimize the chances of explosion. The venting cap allows the electrolyte of a cell to leak out before an internal fire can occur.

Although it is advantageous to use protective circuitry, it is possible to operate the present invention without protective circuitry, which simplifies the system to allow charging or discharging. Omitting all of the electronic protection circuitry for upper voltage cut-off (overcharging), lower level voltage cut-off (over discharging) and temperature measurements reduces the overall manufacturing cost of the starter battery. This also simplifies the system to allow charging or discharging in all conditions and not be restricted by any suggested or specified operating range.

By using lithium cells, a battery housing structure is both smaller and lighter than with lead-acid cells. Any time less internal mass is involved the housing structure size can be reduced, which also results in reducing cost.

Figures 1, 2:
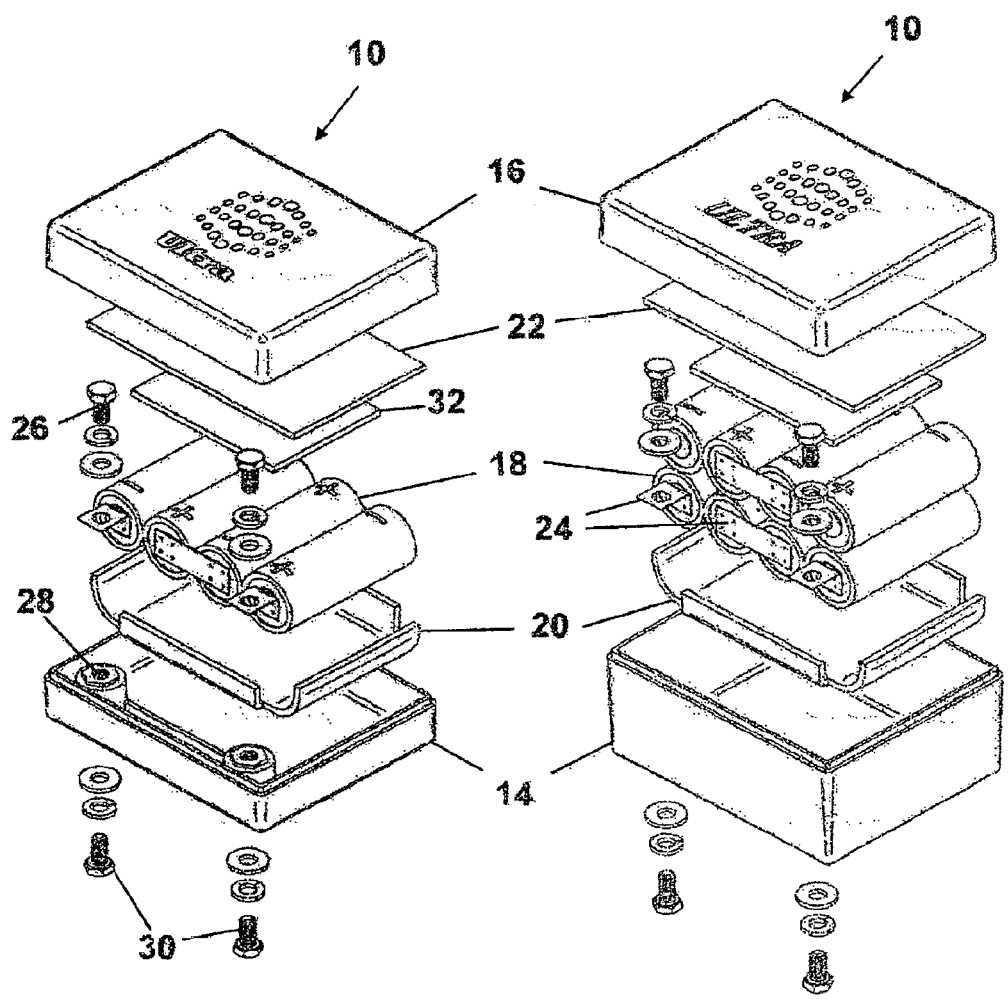
FIG. 1 is an exploded isometric view of one embodiment of the invention, in which 4 cells are arranged into a starter battery pack.
FIG. 2 is an exploded isometric view of another embodiment of the invention, in which 8 cells are arranged into a starter battery pack.

The housing structure of the embodiment of FIGS. 1 and 2 may vary in depth to accommodate varying numbers of cells which provides for different capacity. The lid structure of the housing (or casing) for cylindrical cells is the same for most battery packs, as shown. Such cells can be stacked in parallel to allow for larger capacity for different battery packs to be assembled. The lid of the housing also incorporates a threaded bushing made from aluminum to minimize weight, but that has similar electrical properties to aluminum, copper or brass, or an internally threaded hole to receive an electrical connector screw.

Referring now to the drawings, and particularly to FIG. 1, the invented battery pack 10 comprises a housing 12, having a lower receptacle 14 and a mating top 16, at least one lithium-based rechargeable battery 18, or cell, within the housing, with appropriate electrical connections. The total discharging amount of each lithium-based cell in the battery pack is one (1) to 5000 Ah, and charging voltage per one cell is 3.0 to 4.2 V.

The lower portion of the housing 16 can be provided with bottom padding 20 which fits therein, receives the cell or cells, and mates with the lower receptacle 14. A top pad 22 can be provided in the top 16 of the housing, as desired.

Electrical connections 24 are provided between the cells, as shown, positive to negative, with screws 26 connecting the cells through holes 28 the bottom of the housing to electrical leads, not shown, but which leads connect to bottom screws 30. Alternatively, a welded connection can be used instead of screws.

Optionally, a protection circuit board 32 may be placed within the upper casing or top 14 for safety protection. Such a protection circuit board may be a cutoff board or a cell-balancing circuit board. A cell-balancing circuit board may include a cutoff function. A lithium iron battery having two or more cells in series has a battery voltage equal to the sum of the individual cell voltages. Over the life of the battery, it may be charged and discharged for hundreds or thousands of cycles. The individual cells may age differently. Some cells may become mismatched with respect to the others. This phenomenon is corrected, by balancing. Balancing is the process of forcing all of the cells to have identical voltages. This is accomplished by a balancing circuit.

Starter battery systems can utilize a greater number of lithium cells as desired for greater capacity.

Lithium cells have substantially less weight than a lead-acid cell, and are 80% smaller. A lithium cell will last about 3 times as long as a lead-acid cell with 100% full discharge cycles. Lithium cells are maintenance free, whereas lead-acid cells need to be refilled with distilled water to maintain the acid level above the plates. Lithium cells do not freeze. They have a discharge power 8 times that of lead-acid. Their charging time is less than 2 hours.

Lithium cell self discharge rate is less than 2% monthly, whereas the self discharge rate for a lead-acid cell is 10% monthly.

Lithium cells can operate at very high temperature, up to 70° C. without major degradation. They can also operate at very low temperature, down to −30° C. with slight capacity degrade at that temperature, but power is available.

Lithium cells are 98% energy efficient (energy going in and out of the cell), whereas lead-acid cells are only 90% energy efficient.

For each 12 volt increment, four $LiFePO_4$ cells are required in series, and some cases fewer cells with other lithium chemistries. The following Table compares the lead-acid battery voltages to the $LiFePO_4$ cell requirements and for other lithium-based battery cells:

TABLE I

| Nominal Lead-Acid Voltage | $LiFePO_4$ (3.3 V nominal) | ($LiCoO_2$), ($LiMn_2O_4$), ($LiNiCoAlO_2$), ($LiNiMnCoO_2$), or ($Li_4Ti_5O_{12}$) (3.7 V nominal) |
|---|---|---|
| 12 V | 3 to 4 cells in series | 2 to 4 cells in series |
| 24 V | 5 to 9 cells in series | 5 to 8 cells in series |
| 36 V | 8 to 13 cells in series | 7 to 12 cells in series |
| 48 V | 11 to 17 cells in series | 10 to 16 cells in series |
| 60 V | 14 to 22 cells in series | 12 to 19 cells in series |
| 72 V | 16 to 26 cells in series | 15 to 23 cells in series |
| 84 V | 19 to 31 cells in series | 17 to 27 cells in series |
| 96 V | 22 to 35 cells in series | 19 to 31 cells in series |
| 108 V | 25 to 39 cells in series | 22 to 35 cells in series |
| 120 V | 27 to 44 cells in series | 24 to 39 cells in series |

As shown in FIGS. 3 through 6, a block 40 formed of one or more flat prismatic cells connected in series is fitted into a housing 12, each block of cells having a common set of electrical connections 42A and 42B. A protection circuit board 30 is provided within the housing, and is electrically connected to the block. FIGS. 4 through 6 show the assembled housing with the electrical connections 24A and 24B in the top thereof.

FIG. 7 shows a block of 4 flat lithium based prismatic cells connected to a balancing circuit board 46, which has a balancing controller or microprocessor 60. FIG. 8 shows a block of 4 flat prismatic cells connected to a balancing and cutoff circuit board 48, which includes a controller 60 and a solid state cutoff switch 62, such as an FET. FIGS. 9 through 12 show the housing 12 for the battery pack 10 with positive terminal 34 and negative terminal 36.

Figures 3, 13:
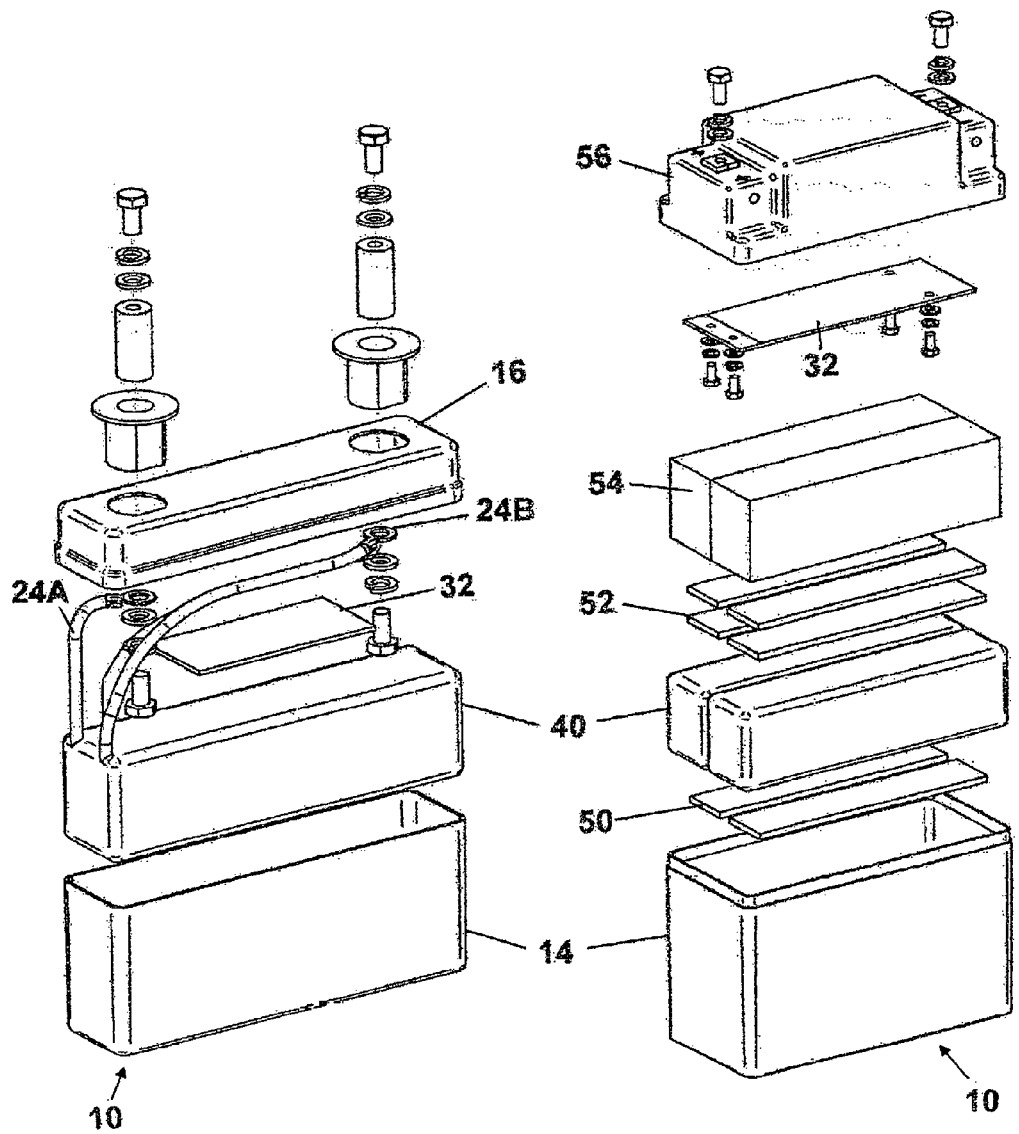
FIG. 3 is an exploded isometric view of another embodiment of the invention, in which a prismatic cell is arranged into a starter battery pack.
FIG. 13 is an exploded isometric view of an alternative embodiment of the invention of FIG. 3, in which 2 blocks of prismatic cells and a control board of cutoff switch are arranged into the housing of FIG. 9.
Figure 9:
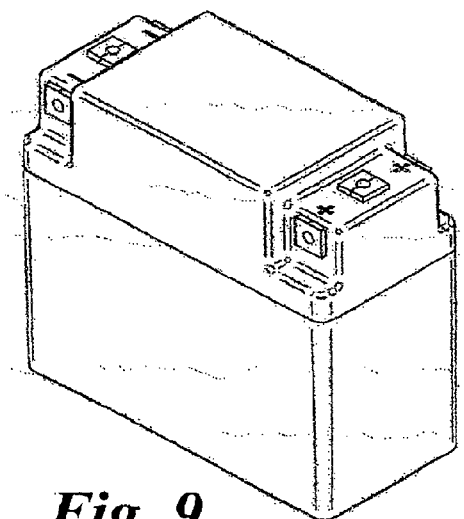
FIG. 9 is an isometric view of an alternative embodiment of a housing showing contacts for switches.
Figure 10:
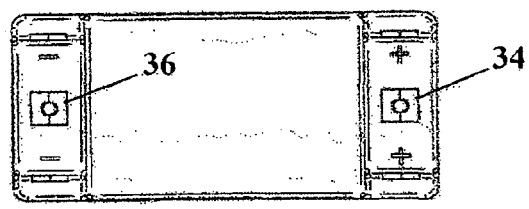
FIG. 10 is a top view of the housing of FIG. 9 showing the contact locations.
Figure 11:
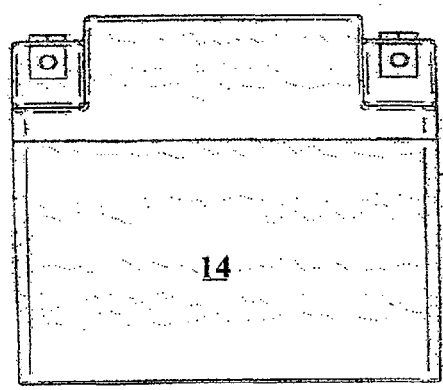
FIG. 11 is a front view of the housing of FIG. 9, the rear view being identical.
Figure 12:
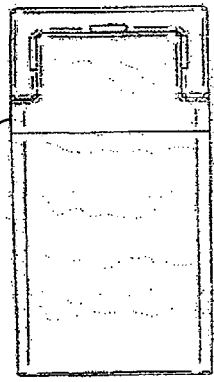
FIG. 12 is an end view of the housing of FIG. 9, the opposite end being identical.

FIG. 13 shows multiple blocks 40 of flat cells along with bottom padding, packing, or spacers 50, flat packing 52, and large packing blocks 54, all of which packing is optional. The upper portion or top section 56 of the housing is advantageously provided with three contacts on each end thereof, as shown.

An auto-detect restart feature is especially useful for a motorcycle: "IQ Restart technology" protects the battery from a deep cycle discharge by monitoring battery voltage level and shutting the battery power off prior to a full discharge, such as in the case of leaving a headlight or electrical component on for an extended period of time while the engine is off. Enough reserve power is left in the battery, to automatically detect (by measuring a change in resistivity) a starting effort and allow the user to start the engine again. This avoids the cyclist being stranded or the headache of replacing a battery. The auto-detect apparatus has at least one lithium-based cell, a voltage detector, an associated switch such as a cutoff board, or a micro-controller in a balancing circuit connected to a solid state switch, such as an FET. One function turns off an FET in the circuit when the voltage drops to a preselected level, leaving sufficient reserve capacity for starting the engine. A second function detects a "keying cycle" or the resistance change upon attempting to start the engine, which turns on the FET. This resistance change is a reaction to a key turn, push button, or remote activator.

To control the solid state switches, electronic controls are needed for the different voltages, currents and/or temperature with specified parameters in which cells work to prevent damage. The control electronics used in battery systems are often referred to a Battery Management System (BMS) or Battery Management Unit (BMU). The BMS or BMU can individual monitor all the cell or battery voltages, and/or temperatures. To protect a single cell or battery from being over charged, that might lead to an exothermal runaway reaction creating a fire and/or to prevent the cell from damaging when discharging them too low, the solid state switch would close or open the current pathway to prevent cell damage from occurring.

The arrangement of devices shown in FIGS. 15 and 16 are examples of how solid state switches can be configured to connect the "Drains" or "Sources" together which is an unconventional approach. The solid state switches in parallel are examples to increase the current capabilities.

Figure 17:
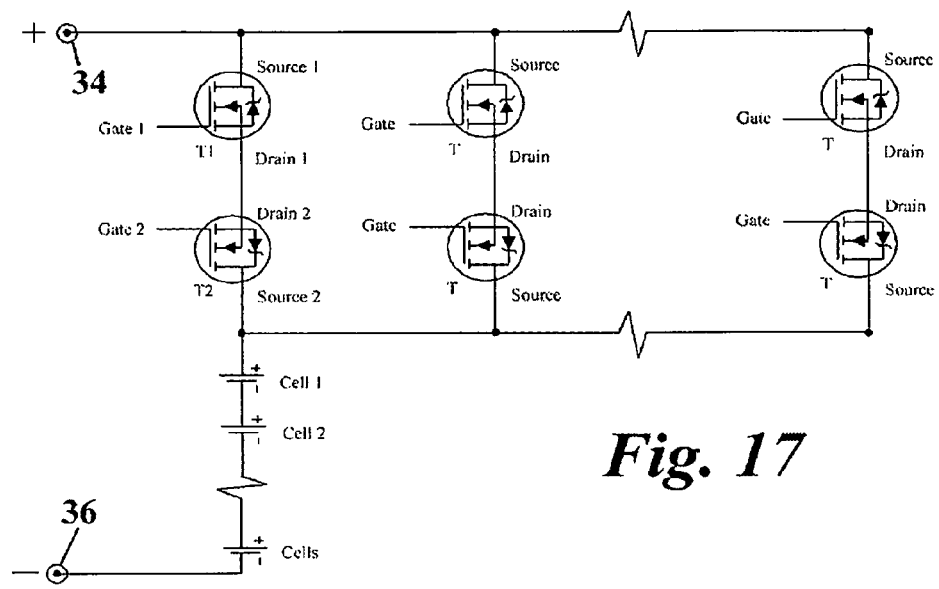
FIG. 17 is a schematic diagram example of connecting the "Drain" of each gate together using N type FET, MOSFET, or IGBT with the cells being below the solid state switches.
Figure 18:
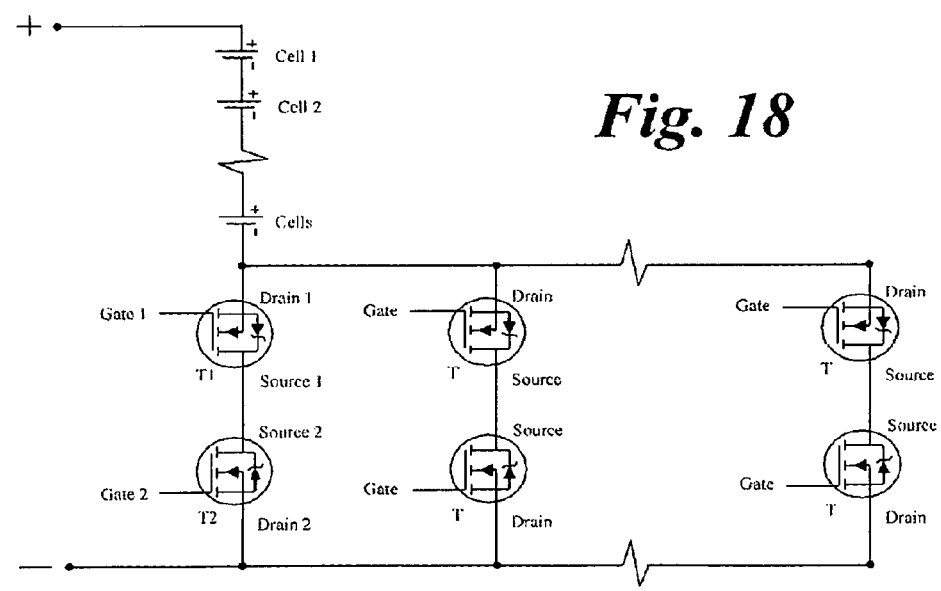
FIG. 18 is a schematic diagram illustrating connecting the "Source" of each gate together using N type FET, MOSFET or IGBT with the cells being above the solid state switches.
Figure 19:
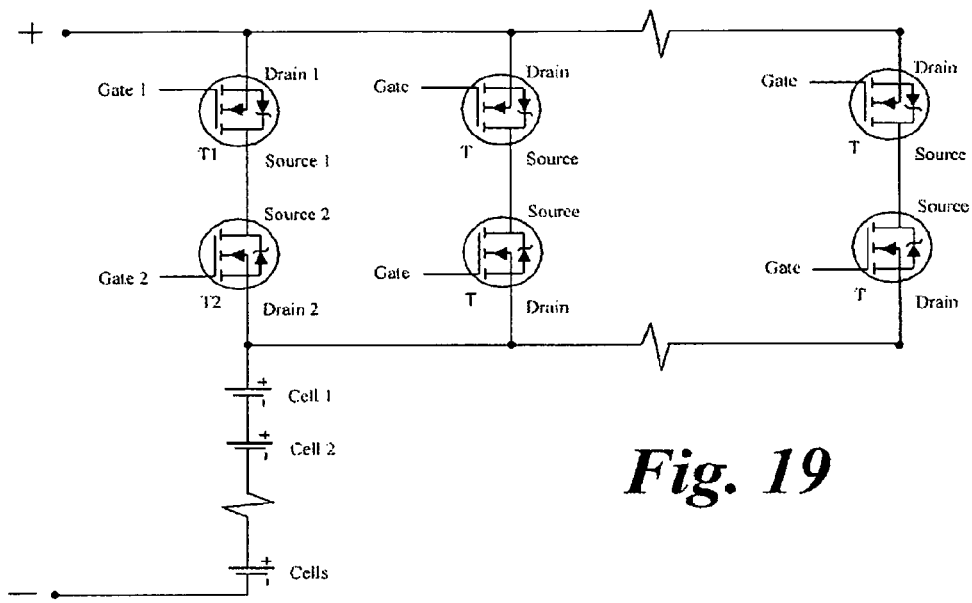
FIG. 19 is a schematic diagram illustrating connecting the "Source" of each gate together using N type FET, MOSFET or IGBT with the cells being below the solid state switches.
Figure 20:
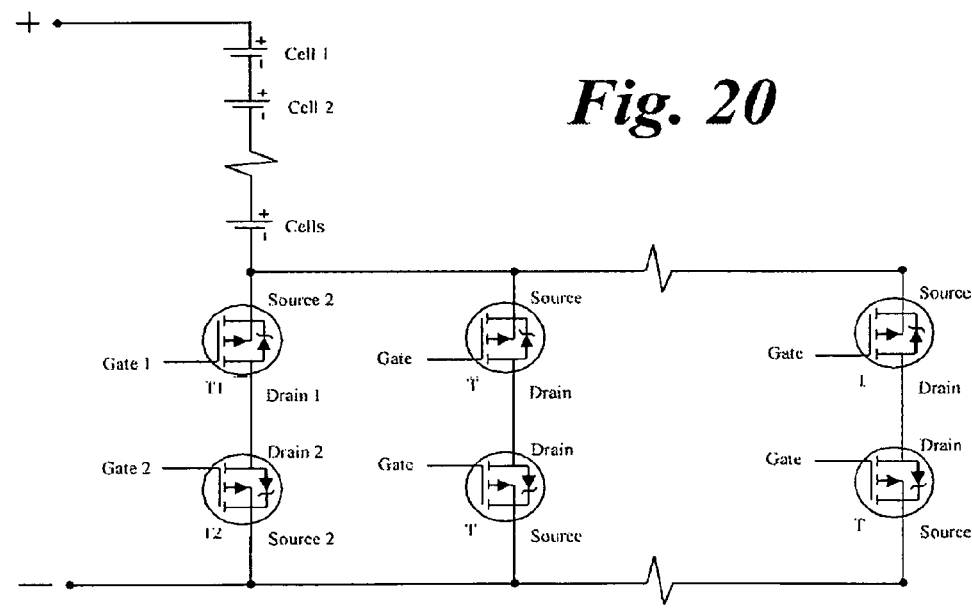
FIG. 20 is a schematic diagram illustrating connecting the "Drain" of each gate together using P type FET, MOSFET or IGBT with the cells being above the solid state switches.
Figure 21:
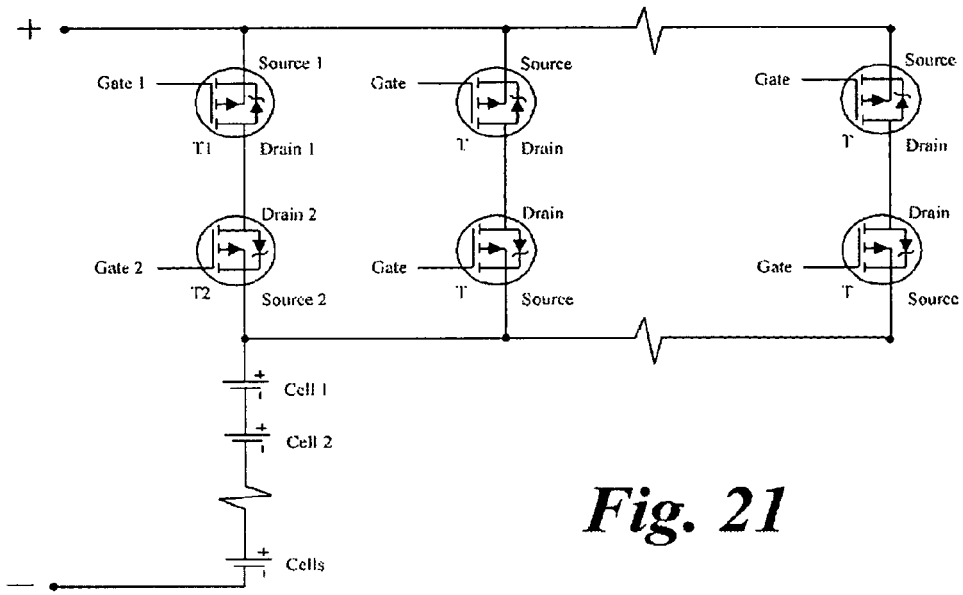
FIG. 21 is a schematic diagram illustrating connecting the "Drain" together using P type FET, MOSFET or IGBT with the cells being below the solid state switches.
Figure 22:
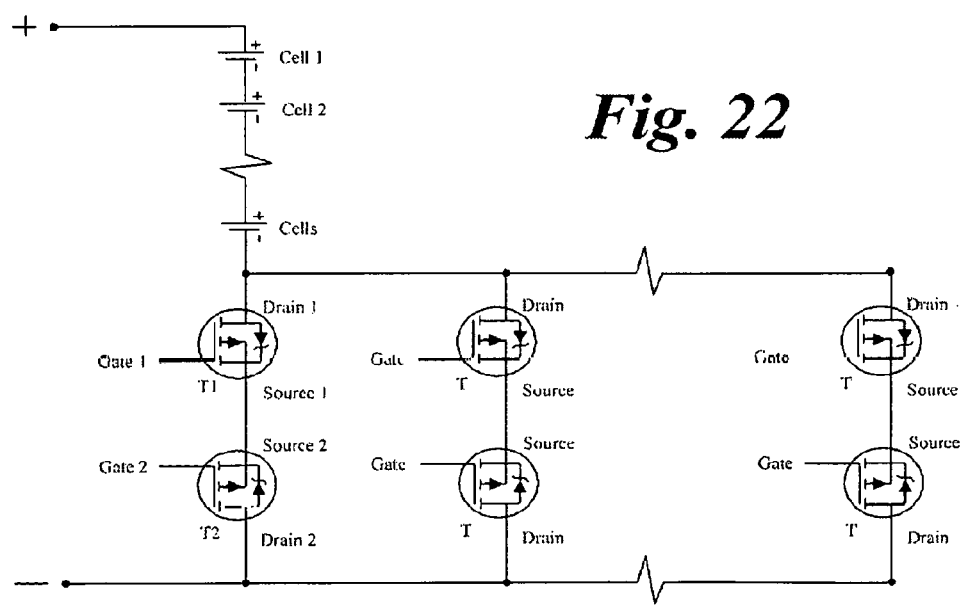
FIG. 22 is a schematic diagram illustrating connecting the "Source" together using P type FET, MOSFET or IGBT with the cells being above the solid state switches.
Figure 23:
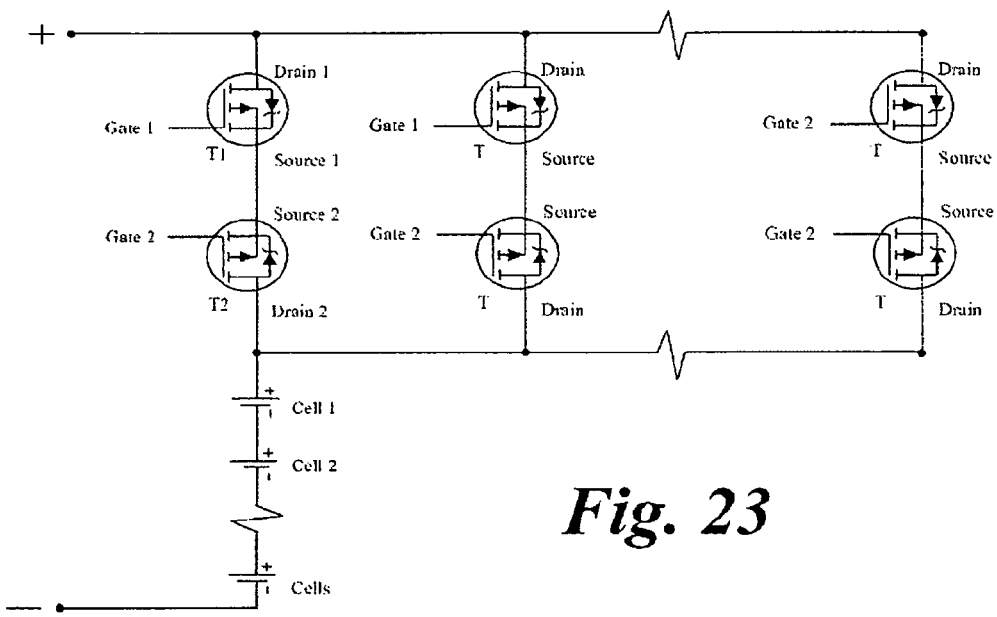
FIG. 23 is a schematic diagram illustrating connecting the "Source" together using P type FET, MOSFET or IGBT with the cells being below the solid state switches.

Referring particularly to FIG. 17, under normal operations both T1 and T2 are ON allowing power pathway to go in both directions: discharge and charge. Should a cell be outside of its specified working specification (cell voltage), both D1 and D2 can be turned off but current can still flow through the internal diode to allow for added functionality.

In the event that the cell voltage drops too low, below the set voltage configuration, from a drain on the battery, T1 will turn off, preventing further discharge from occurring. However, with the internal diode in place of T1, and T2 still on, the circuit will allow charging to occur.

If the cell voltage goes too high, above the set voltage configuration, T2 will turn off, preventing further over charging from occurring. However, with the internal diode in place of T2, and T1 still on, the circuit will allow discharging to occur.

Using solid state switching in the configuration shown in FIG. 17 allows for user friendly reactivation of the circuit without any pushbuttons or reset buttons. Both Charge and Discharge current can go through the internal MOSFET or IGBT diode to bring the cell back to the specified operating voltage.

Alternative switch and gate arrangements are set forth in FIGS. 18 through 23. Each such arrangement works in a similar manner as that describing the FIG. 17 operation.

Figure 24:
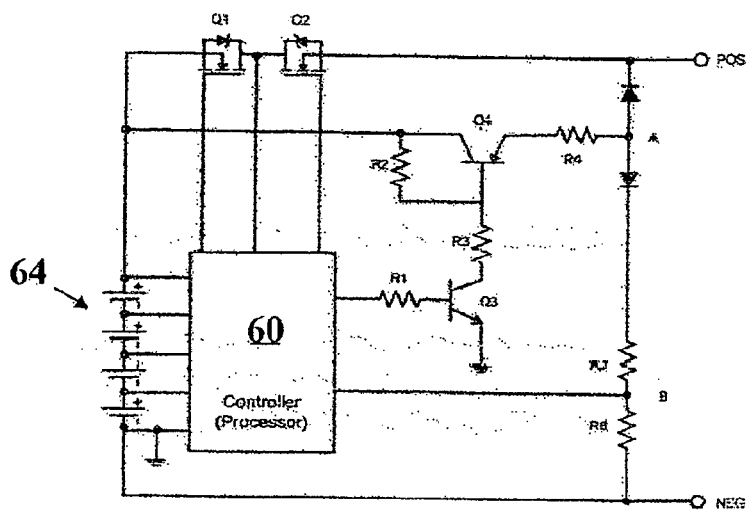
FIG. 24 is a schematic diagram illustrating the invention utilized in engine restarting.

The invention's restart function is illustrated by FIG. 24. Controller 60 is connected to a battery pack having a block of cells 64 and to MOSFETs Q1 and Q2. After a low voltage cutoff, the controller periodically tests the load to detect a change in the load impedance. When an abrupt change in the load impedance is detected, for example connecting or disconnecting a load such as the headlight(s), the ignition switch, or the starter switch, the controller 60 turns on power MOSFETs Q1 and Q2, which reconnects the battery to the vehicle and allows the vehicle to be restarted.

When the controller drives the base of Q3 high through R1, Q3 and Q4 turn on. When Q4 turns on, it connects the battery to the load through R4 and D1. R4 and the load impedance form a voltage divider, and the resulting voltage at node A will depend on the load impedance. D2 steers the node A voltage to the R5/R6 voltage divider which scales down the voltage at node B to a level that the controller can read using an analog-to-digital converter (ADC). The ADC may be of the type commonly included as a built-in peripheral in a micro-controller or a digital signal processor; alternatively the ADC may be a standalone device. After turning on Q4, the controller may make one or more ADC readings after one or more fixed or variable delay periods. By reading the ADC at different times after turn-on, the controller can infer not only the resistive, but also the inductive and/or capacitive components of the load impedance. By tracking the periodic ADC readings and applying the appropriate digital filtering, abrupt changes in the load impedance can be determined. Gradual changes in the ADC readings, which may be caused for example by temperature changes or battery charge depletion, are disregarded (i.e., filtered out). Immediately after making the required ADC reading(s) the Controller turns off Q3 and Q4 to minimize battery drain. It should be noted that while Q3 and Q4 are shown here as bipolar junction transistors, a number of other types of electronic devices could be used to accomplish the switching function of Q4, including but not limited to one or more MOSFETs or a relay.

In order to conserve battery charge as long as possible in low voltage cutoff mode, the controller tests the load impedance only as often as necessary. The testing period is determined by the application, and is approximately 1 to 5 seconds. In a vehicle application, this period represents the maximum time that a user would have to hold a starter switch in the start position in order to effect a restart after a low voltage cutoff. To further reduce drain on the battery, the testing period may be extended if the battery remains in low voltage shutdown mode for a long time, or if the battery voltage (in one or more cells) continues to drop.

Figure 25:
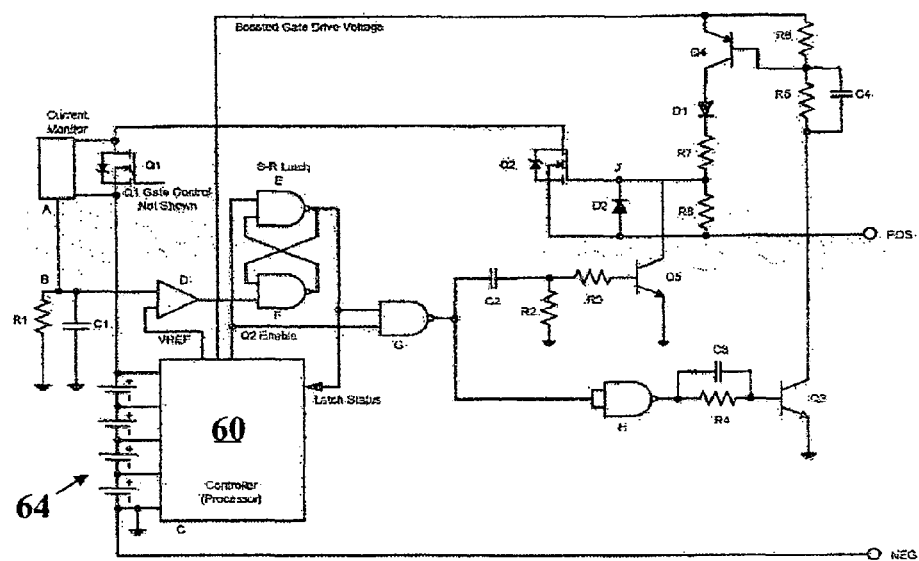
FIG. 25 is a schematic diagram illustrating short circuit protection of a battery.

The invention is useful for short circuit protection as shown in FIG. 25. Cross-coupled NAND gates E and F form a set-reset (SR) latch that controls the gate drive of power MOSFET Q2. The latch is set when the controller 60 drives Q2 ENABLE low. When Q2 ENABLE is driven high again, the output of NAND gate G is low and NAND gate H turns on Q3, which turns on Q4, which supplies the boosted gate drive voltage to turn on Q2. C3 and C4 help ensure fast turn-on of Q2 even with the relatively high value resistors for R4, R5, and R8 required to satisfy the application's low power requirements.

Current monitor A monitors the voltage drop across the drain-source ON resistance ($R_{DS(on)}$) of power MOSFET Q1 and sources a current into node B that is proportional to the MOSFET current. R1 converts this current to a voltage that is compared to VREF at comparator D. When a short circuit occurs, the voltage at node B will exceed VREF (at least momentarily) and cause the output of D to go low, resetting the S-R latch. When the S-R latch is reset the output of G will go high, and C2 will differentiate a positive going pulse into the base of Q5, causing Q5 to turn on for a few microseconds and rapidly discharge the gate of Q2. Rapid turn-off of Q2 is essential to limiting the energy associated with a short circuit event. By monitoring the status of the S-R latch, the controller 60 can determine when a short circuit cut-off event has occurred. C1 low pass filters the signal at node B so that extremely short duration overcurrent conditions can be tolerated if desired. The controller 60 may adjust VREF to compensate for Q2's $R_{DS(on)}$ variation with temperature if desired, or to adjust the over current trip threshold.

The solid state switches can be transistors, FET (field-effect transistors), JFET or JUGFET (junction gate field-effect transistors), BJT bipolar junction transistors, CMOS (complementary metal-oxide-semiconductors), VMOS (Vertical Metal Oxide Silicon), TMOS transistors, vertical DMOS (Double-Diffused MOS), or HEXFET (hexagonal shape MOSFET).

It should be noted that the invented solid state switch apparatus can also be used in any battery system that requires charging and discharging in order to extend the battery life, and for safety. This is extremely useful and is a first for starter batteries.

The solid state devices all need to be the same (N) or (P) type used in the same circuit, as illustrated.

The present invention is a battery pack for powering an electric motor for starting an internal combustion engine in which the electric motor is in a 6 volt to 48 volt operating system. The battery pack consists of a battery pack housing and at least one lithium-based rechargeable cell within the housing. A total discharging amount of each lithium-based cell in the battery pack is from 3 Ah to 2000 Ah, and the charging voltage per single cell is 2.0 to 4.2 V. Preferably, the battery pack consists of from three to sixteen lithium-based rechargeable cells in series in the battery housing.

The following Table shows the peak current developed at room temperature in amperes per pound of lithium cell weight at the indicated amp-hour (Ah) capacities of the lithium battery. The peak current is less at lower temperatures.

TABLE 2

| Capacity | Lithium Cell Weight | Peak Current |
|---|---|---|
| 1 Ah | 0.17 lb | 160 A |
| 2 Ah | 0.5 lb | 400 A |
| 4 Ah | 0.7 lb | 600 A |
| 8 Ah | 1.5 lbs | 1200 A |
| 15 Ah | 3.3 lbs | 2400 A |

Figure 26:
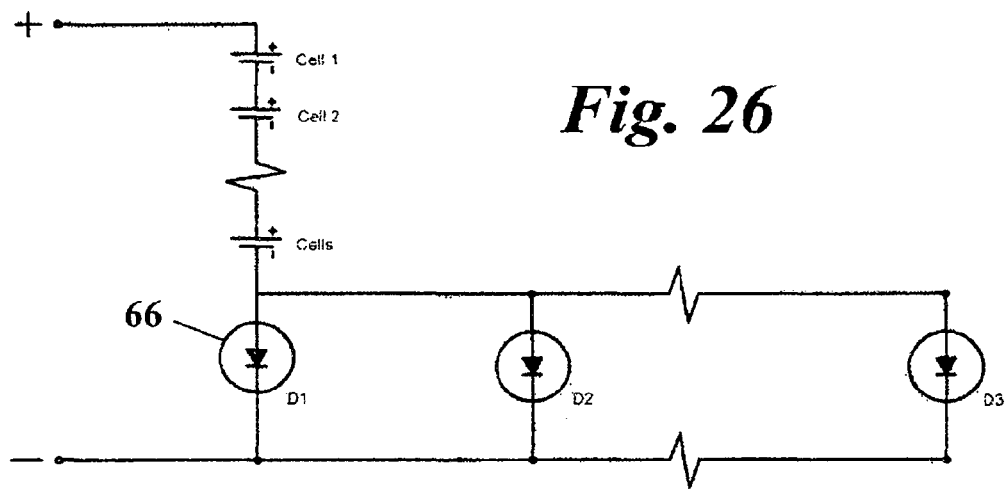
FIG. 26 is a schematic diagram illustrating a circuit with diodes on the negative side to prevent overcharging of a battery.

The circuit arrangement shown in FIG. 26 prevents overcharging of a battery, as the diode 66 on the positive side allows the lithium battery to be discharged. The circuit of FIG. 27 has the diode 68 on the negative side, which allows the lithium battery to discharge, but not to accept a charge from battery clamps 72 (See FIG. 30). In either of these circuits, multiple diodes may be used in parallel.

Figure 27:
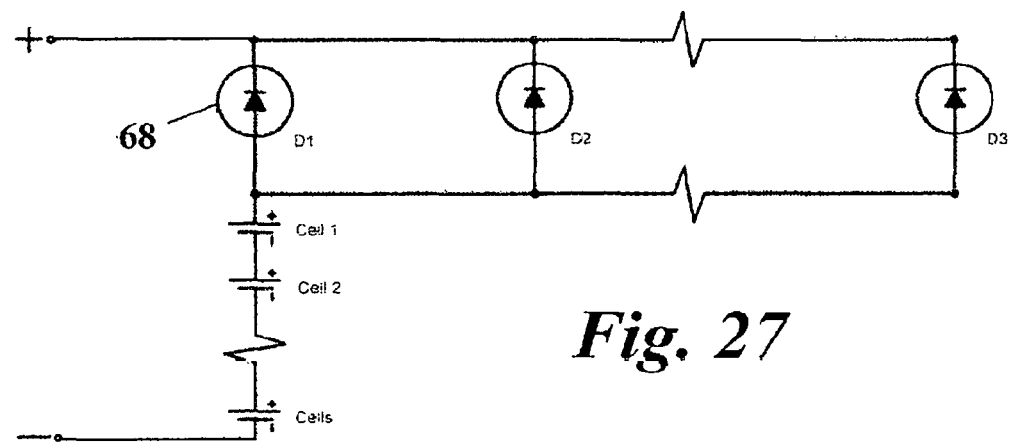
FIG. 27 is a schematic diagram illustrating an alternative circuit with diodes on the positive side for preventing battery overcharging.
Figure 28:
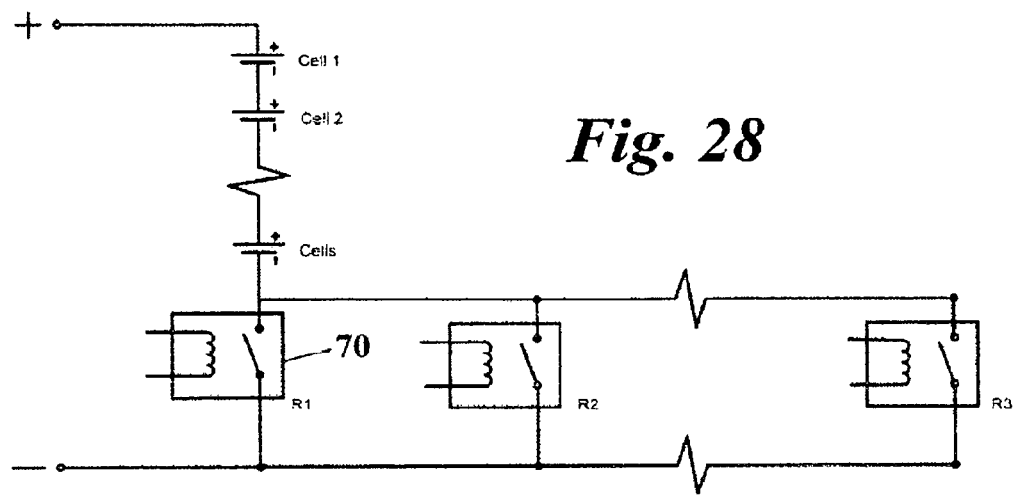
FIG. 28 is a schematic diagram illustrating another alternative circuit for preventing battery overcharging, utilizing a series of relays on the negative side.
Figure 29:
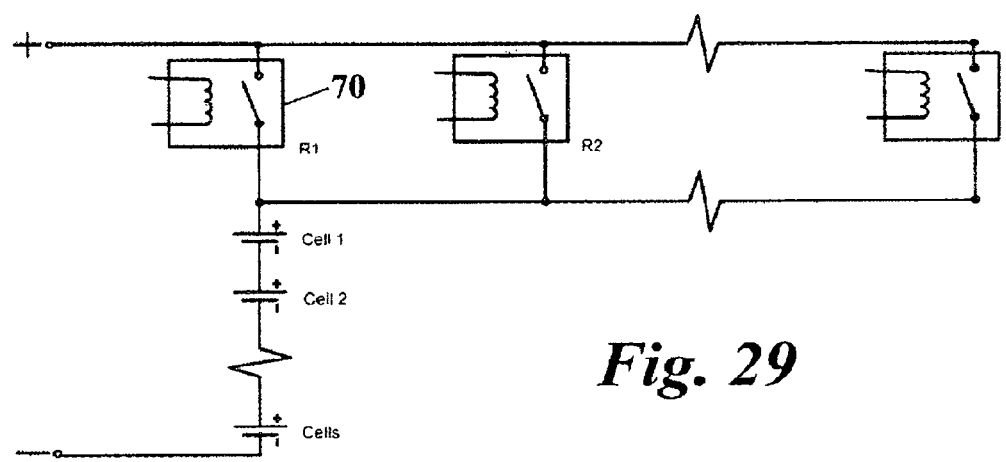
FIG. 29 is a schematic diagram illustrating another alternative circuit for preventing battery overcharging, utilizing a series of relays on the positive side.

The circuits of FIGS. 28 and 29 utilize relays 70 in the place of diodes, and operate generally in the same manner as the circuits of FIGS. 26 and 27. Relays can prevent acceptance of a charge, and prevent discharging to an unacceptably low level.

Figure 30:
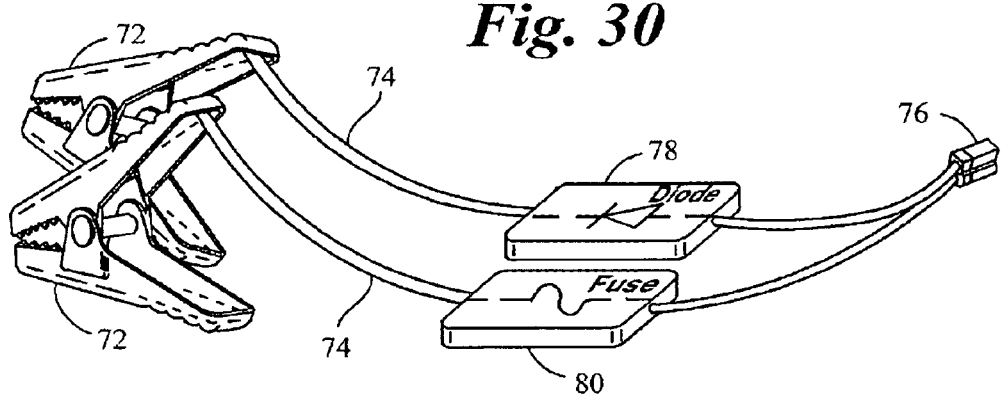
FIG. 30 is an isometric drawing of a battery clamping arrangement with a diode in one lead and a fuse in the other lead to prevent overcharging of a battery.
Figure 31:
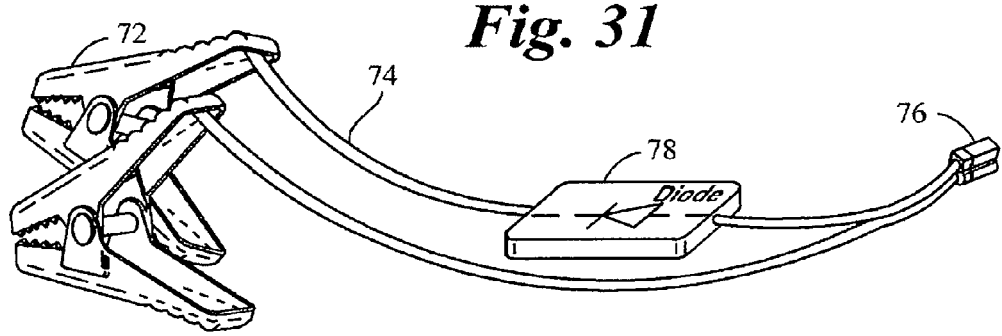
FIG. 31 is an isometric drawing of a battery clamping arrangement with a diode in one lead to prevent overcharging of a battery.
Figure 32:
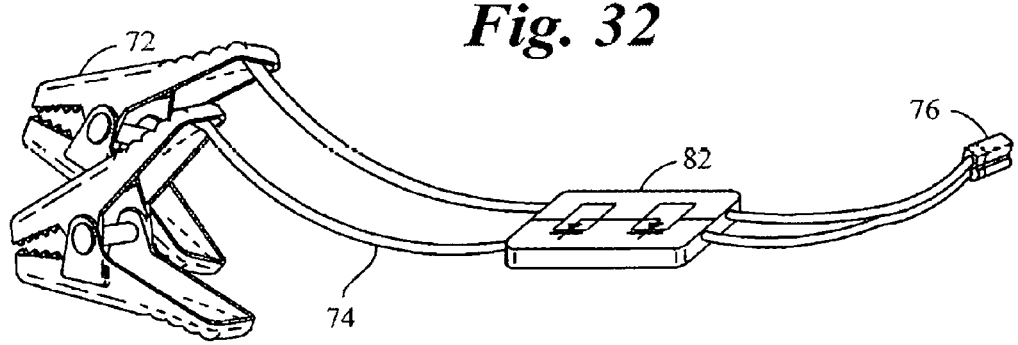
FIG. 32 is an isometric drawing of a battery clamping arrangement with both leads connected to a MOSFET arrangement to prevent overcharging of a battery

FIG. 30 shows jumper cables 74 with attached battery clamps 72 for starting (or jump starting) an engine, the cables being connectable to a lithium battery pack by a connector 76, with one cable having a diode within it, and the other cable containing a fuse. This prevents back charging of the lithium battery from the output of an alternator or magneto after an engine is started. FIG. 31 shows an alternative jumper cable arrangement in which there is no fuse. FIG. 32 shows a jumper cable arrangement in which MOSFETs 82 are employed within the cable housing, which can be in any electrical configuration shown in FIGS. 14 through 23.

Figure 33:
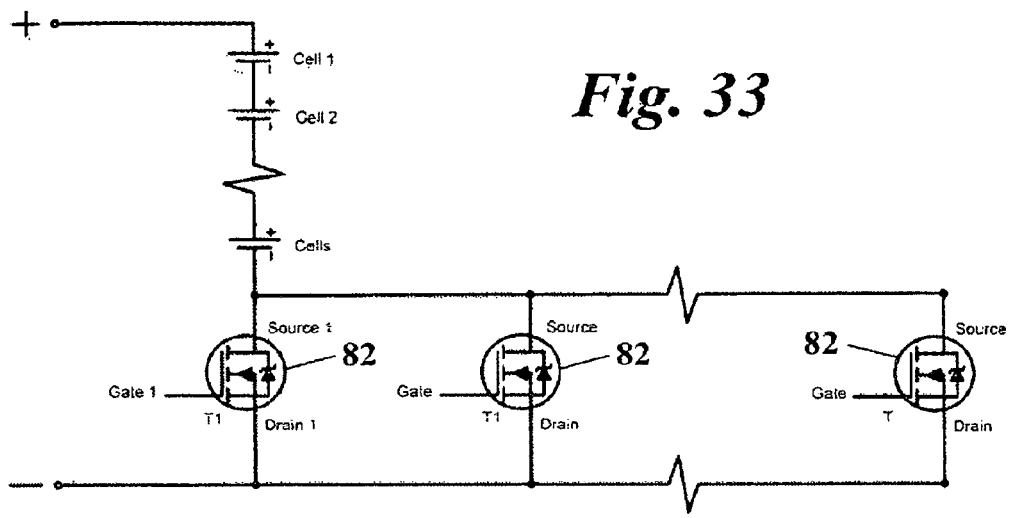
FIGS. 33 through 40 are schematic diagrams illustrating circuits having various MOSFET arrangements for providing under-voltage protection to a battery.
Figure 34:
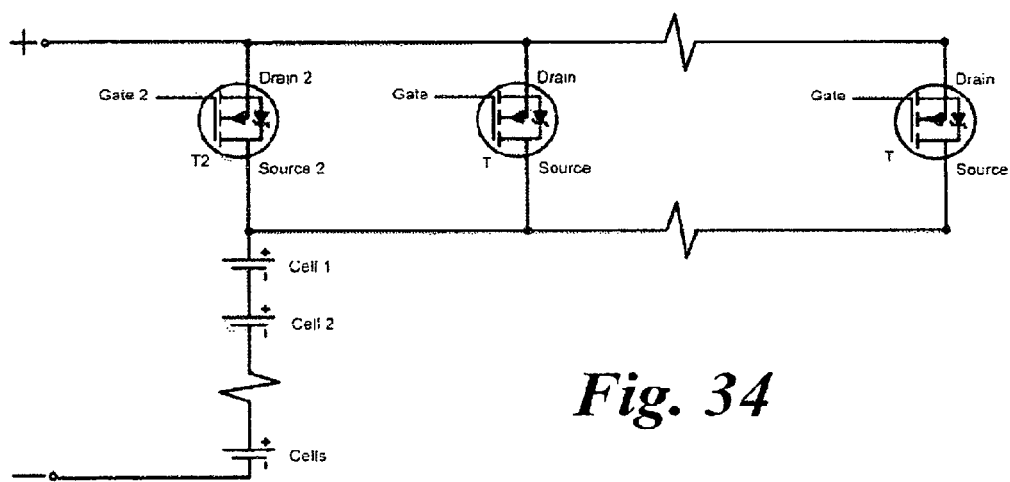
Figure 35:
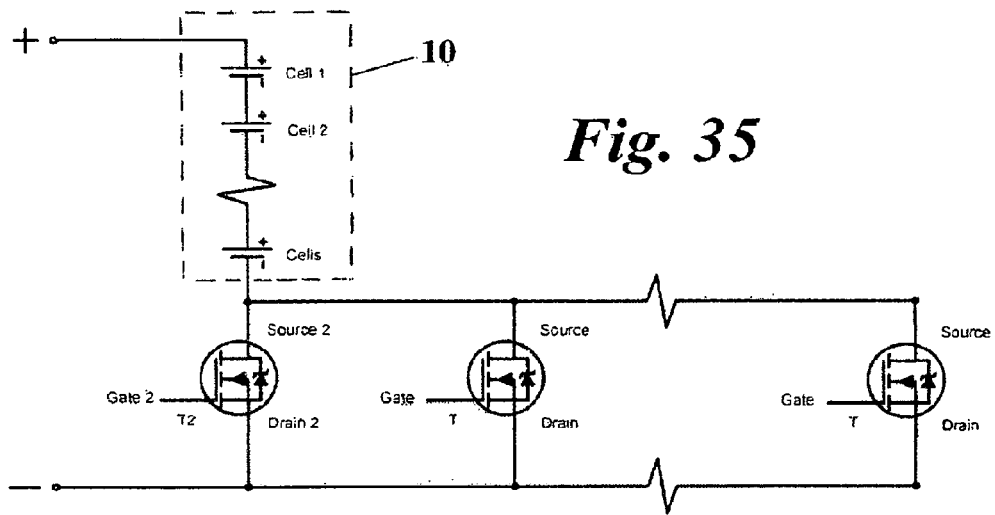

When undervoltage protection is desired, the circuit of FIG. 33 may be utilized, with either a single MOSFET or multiple MOSFETs in parallel. FIGS. 34 through 40 show alternative circuits with different source and drain arrangements to provide the same protection. Multiple lithium based cells are shown in FIGS. 26 through 29 and in FIGS. 33 through 49 which form battery pack 10 as depicted in FIG. 35.

Figure 41:
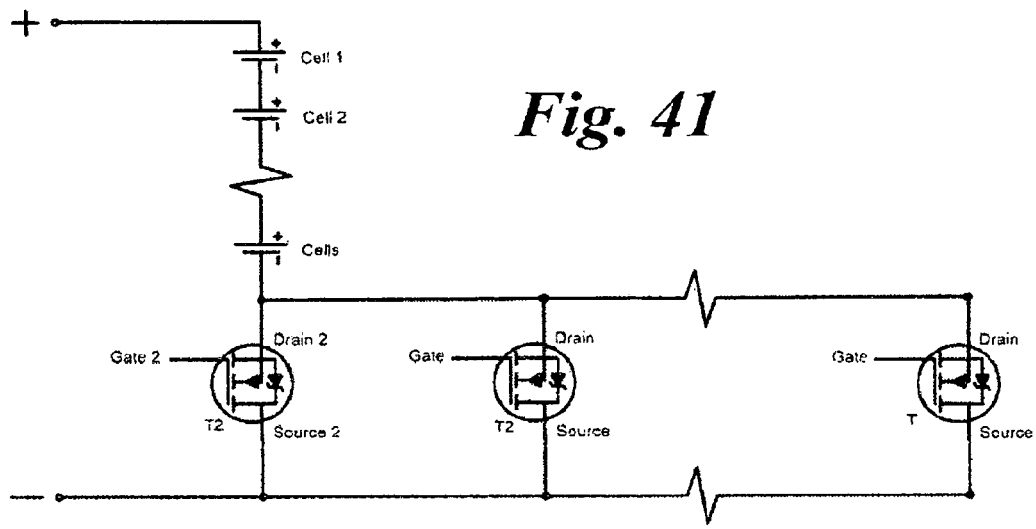
FIG. 41 through 48 are schematic diagrams illustrating circuits having various MOSFET arrangements for providing under-voltage protection to a battery.
Figure 42:
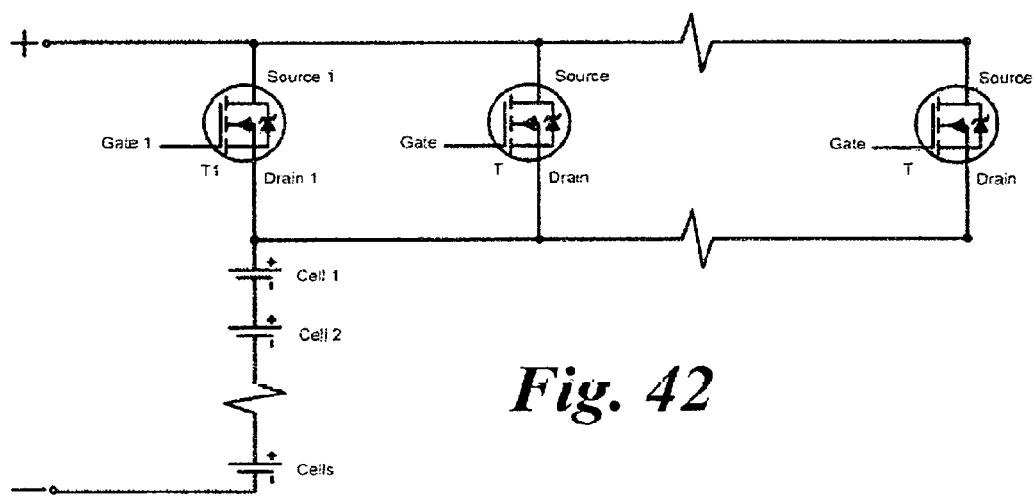
Figure 43:
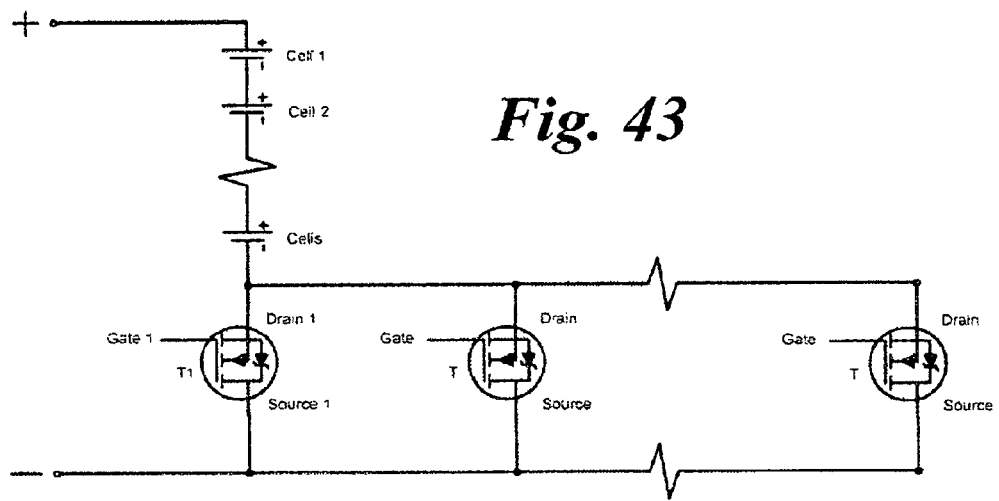
Figure 44:
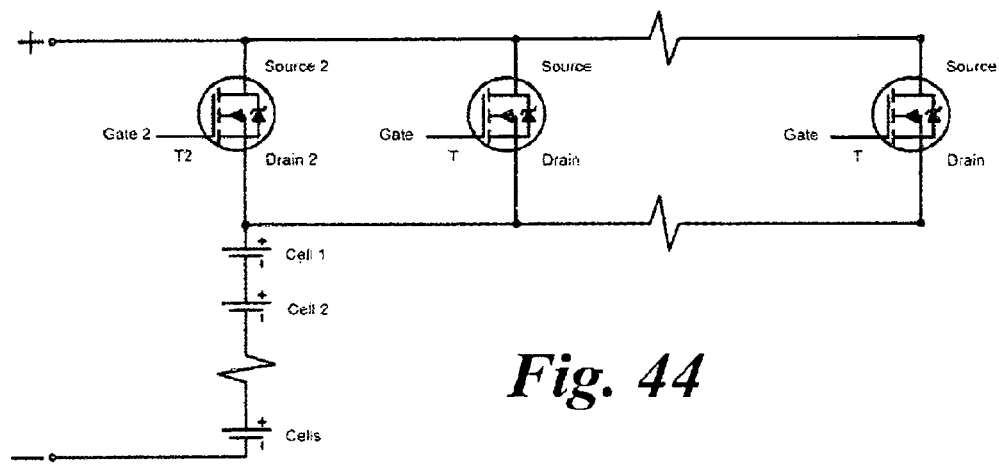
Figure 45:
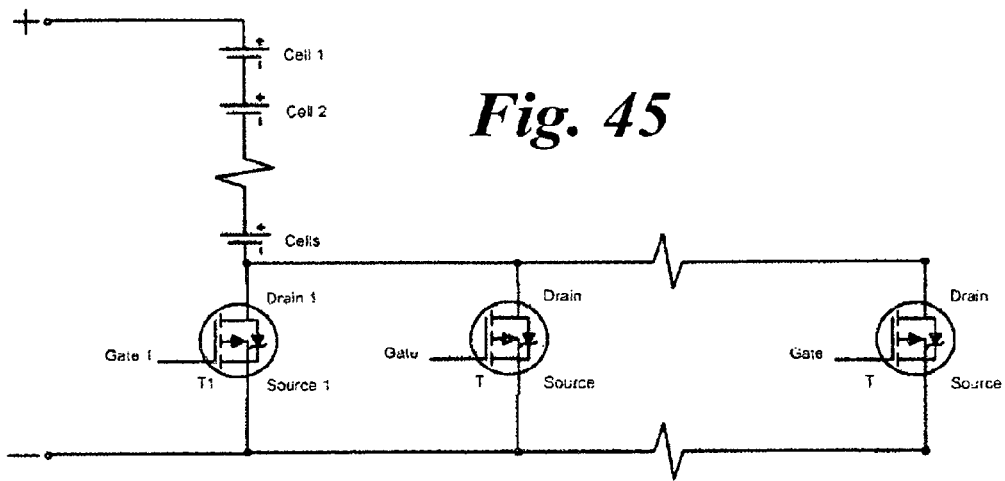
Figure 46:
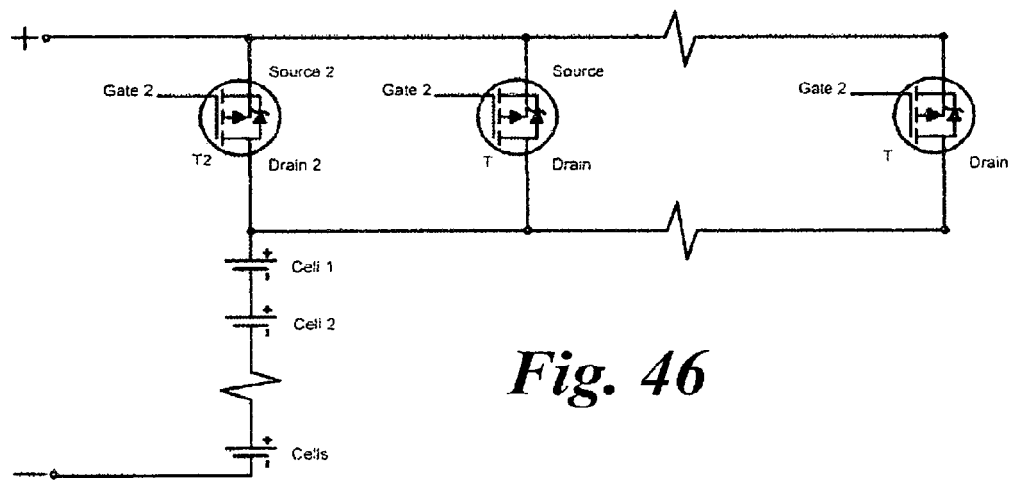
Figure 47:
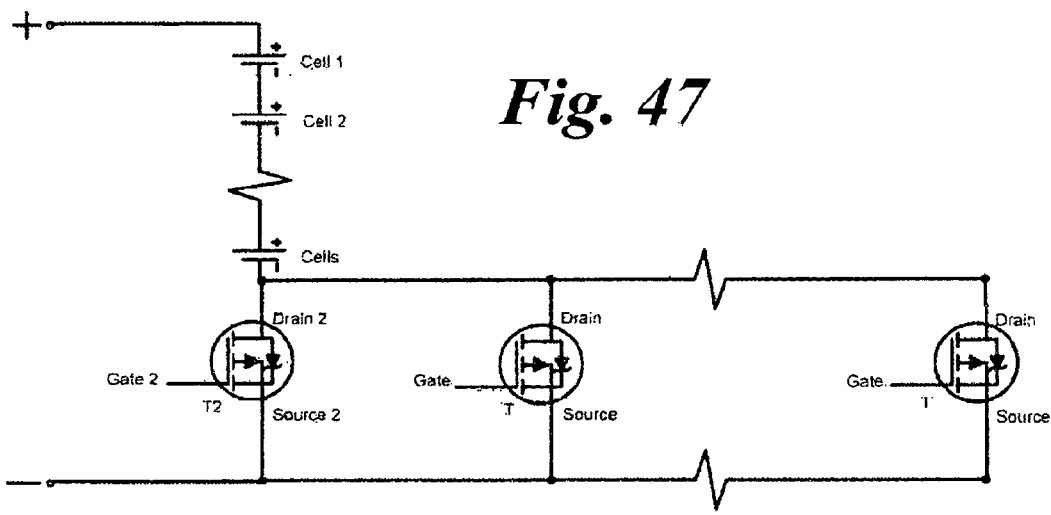
Figure 48:
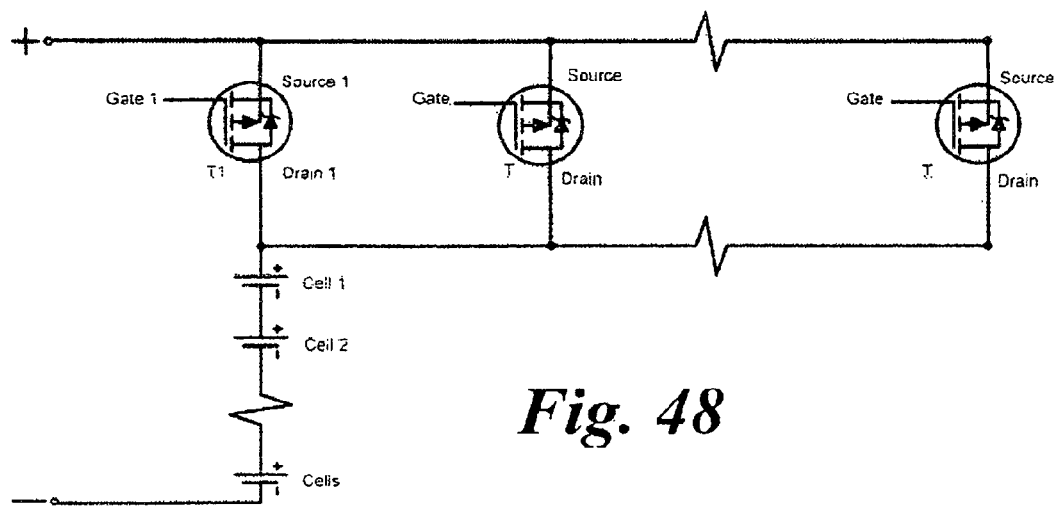

When overvoltage protection is desired, the circuit of FIG. 41 may be utilized, with either a single MOSFET or multiple MOSFETs in parallel. FIGS. 42 through 48 show alternative circuits with different source and drain arrangements to provide the same protection.

The invention also comprehends a jump starter battery pack for driving a battery device in a 12 volt to 120 volt internal combustion engine, the battery pack being situated in a battery pack housing, and having at least one lithium-based rechargeable cell within the housing, the total discharging amount of each lithium-based cell in the battery pack being from three (3) Ah to 5000 Ah, and charging voltage per one single cell being 3.0 to 4.2 V, a pair cables, each cable having a cable housing in which it is situated, one end of each cable being provided with and being connected to a respective terminal clamp, the opposite end of each cable having a connector for connecting to the battery pack, and at least one of a solid state switch, MOSFET, diode, or relay being situated within one of the cable housings.

Figure 49:
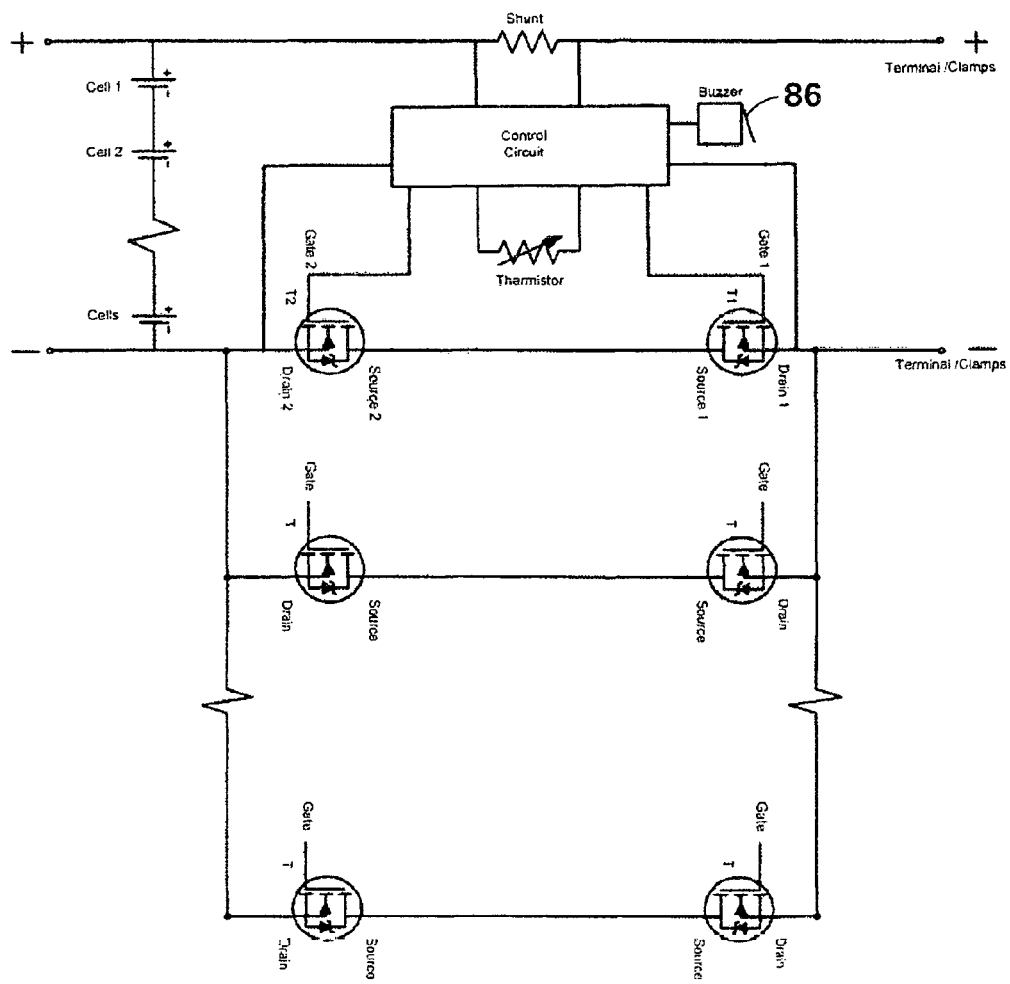
FIG. 49 is a schematic control circuit diagram illustrating short circuit protection, as well as protection from reverse polarity, high temperature, overvoltage, over-discharge voltage, and having an audible alarm.

As shown in FIG. 49, short circuit protection can be provided by the control circuit depicted. An audible alarm such as a buzzer can be provided, which will sound when the lithium base battery is outside its operating range of either voltage or temperature. This circuit will protect against reverse polarity, overvoltage, over-discharge voltage, and excessively high temperature by opening the circuit to terminate the charging. Either single MOSFETs can be employed, or multiple MOSFETs in parallel. There are 8 different configurations that can be employed in this circuit, with either the Sources or Drains connected using either the N type or P type MOSFETs. Using different types of MOSFETs requires them to be either on the Positive or Negative side of the battery. FIGS. 16 through 23 show the variations of the control circuit board, which can be located within either the battery housing or the cable housing.

Figure 36:
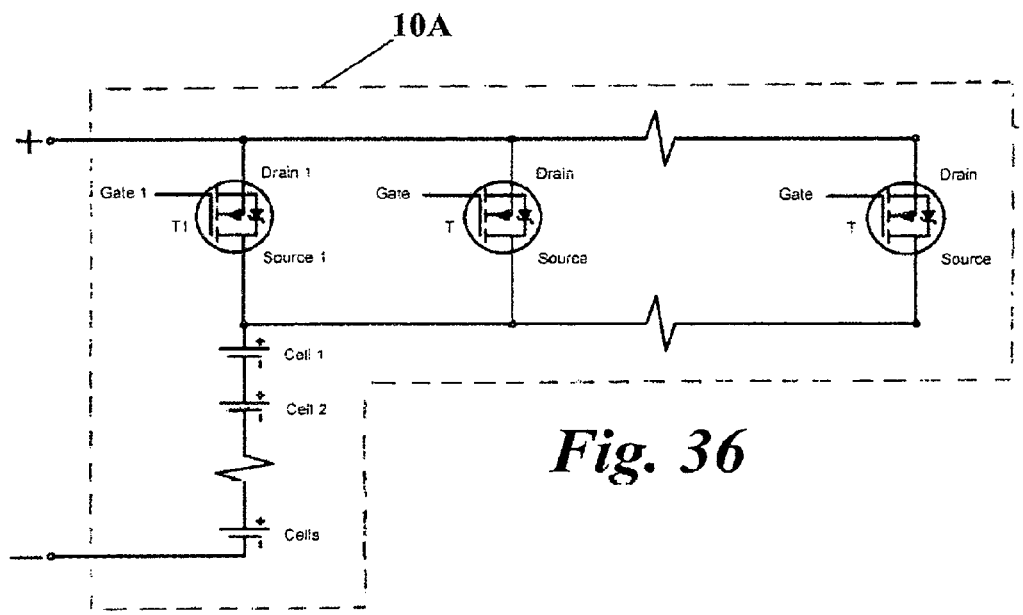
Figure 37:
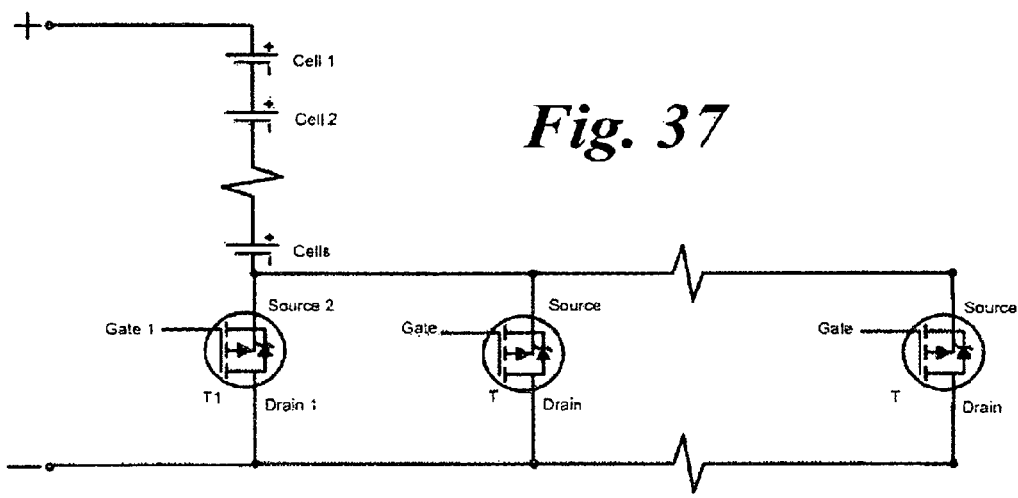
Figure 38:
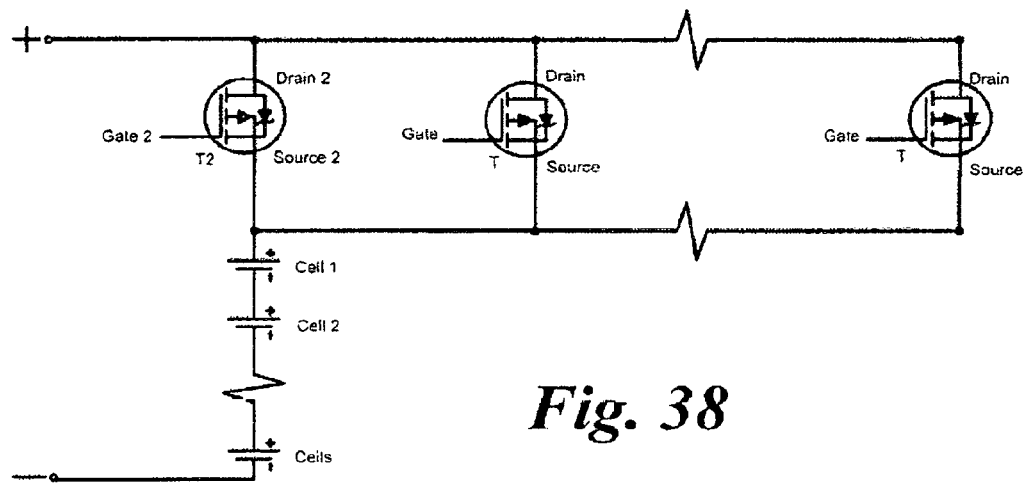
Figure 39:
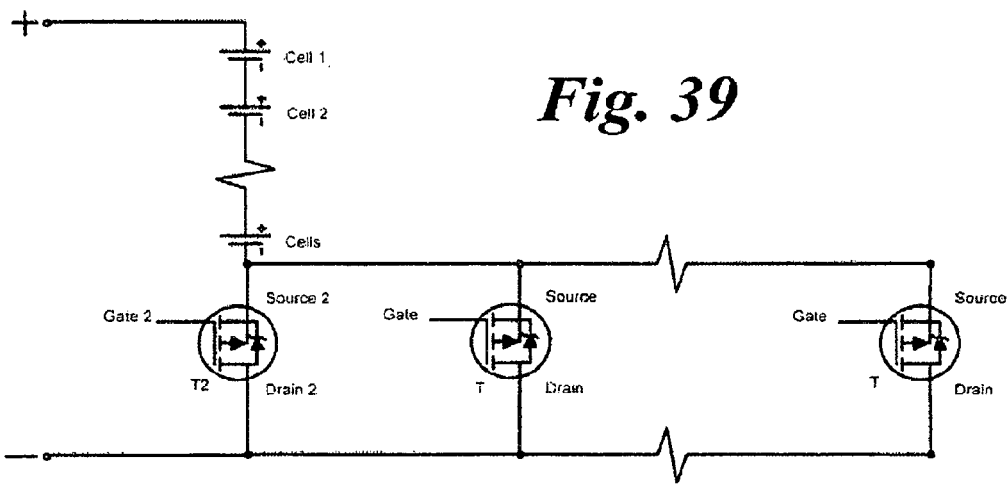
Figure 40:
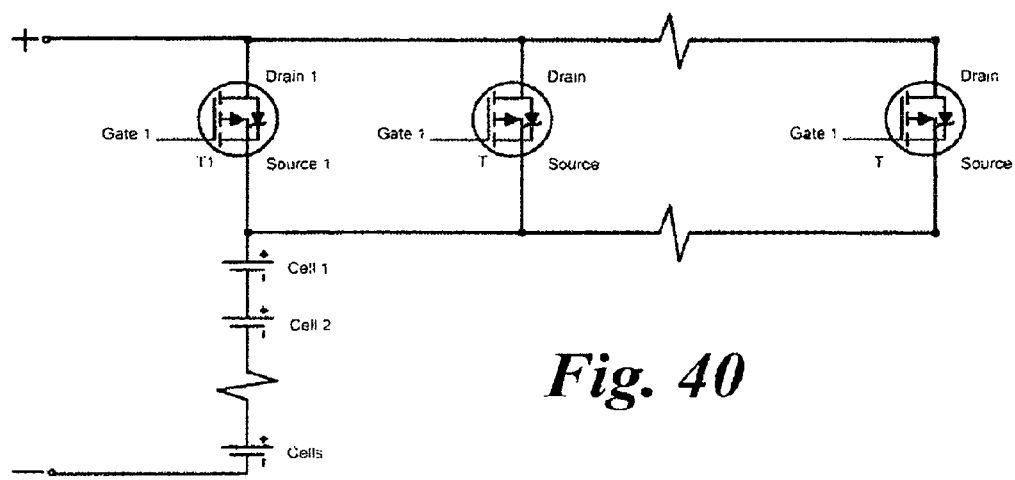

FIG. 35 indicates that the battery pack 10 includes only the lithium based cells, whereas FIG. 36 shows that the battery pack 10A includes one or more solid state switches within the battery pack. The solid state switches can also be located within a cable housing, or connected to a cable.

The invention also comprehends a deep cycle battery for use in wheel chairs, boats, hospital beds, campers and recreational vehicles, golf carts, solar panels for remote areas, and other uses. A deep cycle battery in a 6 volt to 800 volt operating system consists of a battery pack housing, at least one lithium-based rechargeable cell within the housing, and a battery management system including a processor and a circuit board which includes at least one of a solid state switch, MOSFET, diode, or relay, the arrangement of which protects against at least one of overvoltage, undervoltage, reverse polarity, and extremes of temperature. A total discharging amount of each lithium-based cell in the battery pack is from 3 Ah to 2000 Ah, and the charging voltage per one cell is 2.0 to 4.2 V. The lithium-based cell can be any of LiFePO, LiFePO$_4$, LiFeMgPO$_4$, LiFeYPO$_4$, LiCoO$_2$, LiMn$_2$O$_4$, LiNiCoAlO$_2$, LiNiMnCoO$_2$, and Li$_4$Ti$_5$O$_{12}$ cells.

The deep cycle battery can have from two to 250 lithium-based rechargeable cells in series in one or more of said housings.

It should be noted that MOSFETs can function as solid state switches having an ON/OFF function. MOSFETs, diodes, and relays can be positioned in a battery housing, as well as in a cable housing.

SUMMARY OF THE ACHIEVEMENT OF THE OBJECTS OF THE INVENTION

From the foregoing, it is readily apparent that I have invented an improved means for increasing the performance of a starter battery for a starter motor of an internal combustion engine, and a starter battery for an internal combustion engine that is lighter, more reliable, has less bulk, longer cycle life, longer calendar life, and higher turn around efficiency than lead-acid batteries. The starter battery system for an internal combustion engine is easy to assemble, waterproof, and maintenance free, can be used in existing vehicles, and has a wide operating temperature range with exceptional cold-weather cranking performance. The invention also apparatus for protecting a single cell or battery from being over charged, as well as providing apparatus for charging a cell having a very low charge, more effectively, and more economically than heretofore has been possible.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A battery pack having positive and negative terminals for powering an electric motor for starting an internal combustion engine in which the electric motor is in a 6 volt to 48 volt operating system, said battery pack comprising:
   a battery pack housing;
   at least one lithium-based rechargeable cell within said housing; and
   a solid state switching apparatus comprising a plurality of pairs of solid state switches with one pair of solid state switches connected in a parallel configuration to another pair of solid state switches, each switch having a source and a drain, the switches of a pair of solid state switches being configured such that either the drains of the switches are connected or the sources of the switches are connected, and said parallel configuration being connected with one or more cells between the positive and negative terminals,
   wherein a total discharging amount of each lithium-based cell in the battery pack is from 3 Ah to 2000 Ah, and charging voltage per one cell is 2.0 to 4.2 V.

2. A battery pack according to claim 1 wherein the lithium-based cell is selected from the group consisting of LiFePO, $LiFePO_4$, $LiFeMgPO_4$, $LiFeYPO_4$, $LiCoO_2$, $LiMn_2O_4$, $LiNiCoAlO_2$, $LiNiMnCoO_2$, and $Li_4Ti_5O_{12}$ cells.

3. A battery pack according, to claim 1, wherein said battery pack comprises from three to sixteen lithium-based rechargeable cells in series in said housing.

4. A battery pack according to claim 1, further comprising a protection circuit board within said battery housing, said protection circuit board including one of a solid state switch, MOSFET, diode, or relay, which protects against temperature, reverse polarity, undervoltage or overvoltage.

5. A battery pack according to claim 1, wherein the solid state switching apparatus for one or more of said lithium based cells is encased in said battery pack housing, each of said cells shaving a positive pole and a negative pole, said apparatus comprising:
   at least one solid state switch being connected to the positive pole of said one or more cells in series, and to said positive terminal, the negative pole of said one or more cells being connected to said negative terminal.

6. Apparatus according to claim 5, wherein the solid state switches are transistors, FET, MOSFET, IGBT, JFET, BJT, CMOS, VMOS, TMOS, vertical DMOS or HEXFET.

7. Apparatus according to claim 5, wherein said one or more cells are selected from the group consisting of LiFePO, $LiFePO_4$, $LiFeMgPO_4$, $LiFeYPO_4$, $LiCoO_2$, $LiMn_2O_4$, $LiNicoAlO_2$, $LiNiMnCoO_2$, $Li_4Ti_5O_{12}$, lead-acid, NiCd, and nickel metal hydride (NiMH) batteries.

8. A battery pack according to claim 1, wherein the solid state switching apparatus for one or more of said lithium based cells is encased in said battery pack housing, each of said cells having a positive pole and a negative pole, said apparatus comprising:
   at least one solid state switch being connected to the negative pole of said one or more cells in series, and to said negative terminal, the positive pole of said one or more cells being connected to said positive terminal.

9. Apparatus according to claim 8, wherein the solid state switches are transistors, FET, MOSFET, IGBT, JFET, BJT, CMOS, VMOS, TMOS, vertical DMOS HEXFET.

10. Apparatus according to claim 8, wherein said one or more cells are selected from the group consisting of LiFePO, $LiFePO_4$, $LiFeMgPO_4$, $LiFeYPO_4$, $LiCoO_2$, $LiMn_2O_4$, $LiNiCoAlO_2$, $LiNiMnCoO_2$, $Li_4Ti_5O_{12}$, lead-acid, NiCd, and nickel metal hydride (NiMH) batteries.

11. Apparatus according to claim 1, wherein the operating system of said internal combustion engine includes a battery, said apparatus further comprising a pair of cables, each cable situated in a cable housing, one end of each cable connectable to a respective terminal clamp, the opposite end of each cable having a connector for connecting to said battery pack, and at least one of a MOSFET, diode, or relay being situated within one of said cable housings.

12. A deep cycle battery having positive and negative terminals in a 6 volt to 800 volt operating system, comprising:
   a battery pack housing;
   at least one lithium-based rechargeable Cell within said housing;
   a battery management system including a processor and a circuit board which protects from one of overvoltage, undervoltage, reverse polarity, short circuit, and extremes of temperature;
   wherein said circuit board comprises a solid state switching apparatus comprising a plurality of pairs of solid state switches with one pair of solid state switches connected in a parallel configuration to another pair of solid state switches, each switch having a source and a drain, the switches of a pair of solid state switches being configured such that either the drains of the switches are connected or the sources of the switches are connected, and said parallel configuration being connected with one or more cells between the positive and negative terminals,
   wherein a total discharging amount of each lithium-based cell in the battery pack is from 3 Ah to 2000 Ah, and charging voltage per one cell is 2.0 to 4.2 V.

13. A deep cycle battery according to claim 12 wherein the lithium-based cell is selected from the group consisting of LiFePO, $LiFePO_4$, $LiFeMgPO_4$, $LiFeYPO_4$, $LiCoO_2$, $LiMn_2O_4$, $LiNiCoAlO_2$, $LiNiMnCoO_2$, and $Li_4Ti_5O_{12}$ cells.

14. A deep cycle battery according to claim 12, wherein said battery comprises from two to 250 lithium-based rechargeable cells in series in one or more of said housings.

15. A deep cycle battery according to claim 12, wherein the solid state switching apparatus for one or more of said lithium based cells is encased in said battery pack housing, each of said cells having a positive pole and a negative pole, said apparatus comprising:
   at least one solid state switch connected to the positive pole of said one or more cells in series, and to said positive terminal, the negative pole of said one or more cells being connected to said negative terminal.

16. Apparatus according to claim 15, wherein the solid state switches are transistors, FET, MOSFET, IGBT, JFET, BJT, CMOS, VMOS, TMOS, vertical DMOS or HEXFET.

17. Apparatus according to claim 15, wherein said one or more cells are selected from the group consisting of LiFePO, $LiFePO_4$, $LiFeMgPO_4$, $LiFeYPO_4$, $LiCoO_2$, $LiMn_2O_4$, $LiNiCoAlO_2$, $LiNiMnCoO_2$, $Li_4Ti_5O_{12}$, lead-acid, Nicd, and nickel metal hydride (NIMH) batteries.

18. A deep cycle battery according to claim 12, wherein the solid state switching apparatus for one or more of said lithium based cells is encased in said battery pack housing, each of said cells having a positive pole and a negative pole, said apparatus comprising:
   at least one solid state switch connected to the negative pole of said one or more cells in series, and to said negative terminal, the positive pole of said one or more cells being connected to said positive terminal.

19. Apparatus according to claim 18, wherein, the solid state switches are transistors, FET, MOSFET, IGBT, JFET, BJT, CMOS, VMOS, TMOS, vertical DMOS or HEXFET.

20. Apparatus according to claim 18, wherein said one or more cells are selected from the group consisting of LiFePO, $LiFePO_4$, $LiFeYPO_4$, $LiCoO_2$, $LiMn_2O_4$, $LiNiCoAlO_2$, $LiNiMnCoO_2$, $Li_4Ti_5O_{12}$, lead-acid, NiCd, and nickel metal hydride (NiMH) batteries.

21. A battery pack having positive and negative terminals for driving a battery device in a 12 volt to 120 volt internal combustion engine, said battery pack comprising:
   a battery pack housing;
   at least one lithium-based rechargeable cell within said housing, the total discharging amount of each lithium-based cell in the battery pack being from three (3) Ah to 5000 Ah, and charging voltage per one cell being 3.0 to 4.2 V;
   a pair of cables each cable having a cable housing in which it is situated; one end of each cable being provided with and connected to a respective terminal clamp, the opposite end of each cable having a connector for connecting to said battery pack; and
   a solid state switching apparatus being situated within one of said cable housings and comprising a plurality of pairs of solid state switches with one pair of solid state switches connected in a parallel configuration to another pair of solid state switches, each switch having a source and a drain, the switches of a pair of solid state switches being configured such that either the drains of the switches are connected or the sources of the switches are connected, and said parallel configuration being connected with one more cells between the positive and negative terminals.

* * * * *